(12) United States Patent
Tomura et al.

(10) Patent No.: US 7,457,216 B2
(45) Date of Patent: Nov. 25, 2008

(54) METHOD FOR RECORDING/REPRODUCING DYE-BASED RECORDABLE DVD MEDIUM AND APPARATUS THEREOF

(75) Inventors: Tatsuya Tomura, Tokyo (JP); Tsutomu Sato, Tokyo (JP); Soh Noguchi, Tokyo (JP); Yasunobu Ueno, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 28 days.

(21) Appl. No.: 11/447,894

(22) Filed: Jun. 7, 2006

(65) Prior Publication Data

US 2006/0291351 A1 Dec. 28, 2006

Related U.S. Application Data

(63) Continuation of application No. PCT/JP2004/018218, filed on Dec. 7, 2004.

(30) Foreign Application Priority Data

Dec. 10, 2003 (JP) ............................. 2003-412410
Jan. 29, 2004 (JP) ............................. 2004-022122

(51) Int. Cl.
*G11B 7/00* (2006.01)
(52) U.S. Cl. ................... 369/47.53; 369/59.12
(58) Field of Classification Search ............. 369/47.53, 369/47.51, 59.11, 59.12
See application file for complete search history.

(56) References Cited

U.S. PATENT DOCUMENTS 6,052,347 A   4/2000  Miyata
6,958,958 B2 * 10/2005 Iimura ..................... 369/47.22
7,079,468 B2 *  7/2006 Worthington et al. ......... 369/94
7,193,961 B2 *  3/2007 Suenaga et al. .......... 369/275.4
2002/0110064 A1  8/2002 Yen et al.

FOREIGN PATENT DOCUMENTS

| JP | 2000-163850 | 6/2000 |
| JP | 2001-331937 | 11/2001 |
| JP | 2002-222562 | 8/2002 |
| JP | 2002-358642 | 12/2002 |
| JP | 2003-16651 | 1/2003 |
| JP | 2005-92950 | 4/2005 |

* cited by examiner

*Primary Examiner*—Thang V Tran
(74) *Attorney, Agent, or Firm*—Dickstein Shapiro LLP

(57) ABSTRACT

A recording and reproducing method, wherein, on recording and reproduction of a recordable DVD medium, which has a recording layer containing an organic dye on a substrate having a guide groove with wobble, wherein linear velocity conditions for CLV recording is recorded on the substrate, recording starts at a linear velocity less than a highest linear velocity at the innermost circumference; when the linear velocity is switched over to the highest linear velocity on the way, a comparison is made between an optimum recording power of Po at the highest recording velocity that is temporarily optimized by test-writing in a power measurement area at the outermost circumference and an optimum recording power of Pi at the highest linear velocity that is recorded in the substrate; in the case of Po>Pi, a value given by the formula of "$(Po+Pi)/2+(Po-Pi)^2 Pi$" is employed as a recording power with which recording starts at the highest linear velocity; and in the case of $Po \leqq Pi$, Pi is employed.

9 Claims, 13 Drawing Sheets

METHOD FOR RECORDING/REPRODUCING DYE-BASED RECORDABLE DVD MEDIUM AND APPARATUS THEREOF

CROSS-REFERENCE TO RELATED APPLICATIONS

This is a continuation of Application No. PCT/JP2004/018218, filed on Dec. 7, 2004.

BACKGROUND OF THE INVENTION

1. Field of the Invention

The present invention relates to a recording and reproducing method and an apparatus thereof for a dye-based recordable (write once read many) DVD medium which can record and reproduce information by irradiating light-beam to produce optical changes of transmission, reflectance, and others in a recording layer, and is also recordable.

2. Description of the Related Art

Development of DVD±R as a large capacity optical disc is progressing now. The element technologies for improving recording capacity are required to be developed, which include development of recording material for micronization of record-pits, introduction of image compression technology represented by MPEG2, and short-shifting of semiconductor laser wavelength which is used for reading record-pits.

As a semiconductor laser in the red wavelength region, only an AlGaInP laser diode of a 670 nm band has been commercialized so far for barcode readers or measuring instruments. However, with the densification of optical discs, red lasers have begun to be used on a full scale in the optical storage market. DVD drives have been standardized by using laser diodes of two bands of wavelengths, a 635 nm band and a 650 nm band, as light sources. On the other hand, playback-only DVD-ROM drives have been commercialized at a wavelength of about 650 nm.

Generally, in a dye-based recordable DVD medium where a pit (mark) is formed by heat mode, pulse width and recording power of a series of recording pulses generated by laser emission on recording are optimized at a given recording velocity, and at a different recording linear velocity changes the state of formed marks or spaces. That is, the heat capacity of heating pulses needed for forming marks becomes insufficient; the average length of mark fluctuates because the temperature to be attained is different from that for an optimum decomposition temperature; or a uniform width of marks is not obtained because of change in the optimum duty ratio of heating pulses, and wider or narrower marks are produced depending on their length. These produce poor jitter performance.

Accordingly, in an optical recording medium compatible with recording from low linear velocity to high linear velocity, optimized recording conditions from a lowest linear velocity to a highest linear velocity are coded and recorded in advance in a stamper, and optimization in recording is attained at each linear velocity by using a substrate which is copied from the stamper.

However, with the advancement of high speed recording, particularly in CLV (constant linear velocity) recording, the rotation speed is too high at the innermost circumference, so that rotation at a highest linear velocity is sometimes disabled from the innermost circumference to a given position in radial direction. To meet this problem, recording is started at an attainable rotation speed at the innermost circumference, and when recording is done to the position in radial direction where recording at a highest linear velocity becomes attainable, the recording velocity is switched to the highest linear velocity. Upon switching the recording velocity, parameters of a recording strategy and a recording power are inevitably different from those used so far from the position of innermost circumference, so that recording is carried out under an optimum condition for the highest linear velocity. For the recording strategy, parameters coded in the medium can be used, but the recording power is often optimized at a value which deviates from the optimum value coded in accordance with the recording environment at that time. For example, after continuous recording job is performed for a given time, by heat generation of driving motors or LDs (laser diode) themselves, the temperature inside a writing drive is increased from the initial value when the writing job starts. With increase of the temperature inside, LD wavelengths shift to longer wavelengths. Particularly, a dye-based recording medium whose sensitivity shows wavelength-dependence suffers from a large effect, thereby deviation of the actual optimum recording power from a coded optimum power is liable to occur. Whenever an optimum recording power is deviated by shifting the LD wavelength to longer wavelengths, the optimum recording power almost always deviates in the direction of increasing its value.

Further, test-writing for optimizing a recording power at the position where the linear velocity is switched cannot be employed in view of continuity of data or reduction in data storage capacity.

When recording is carried out at a constant linear velocity without switching the recording linear velocity, it is needless to say that recording is started after power optimization is carried out using a power calibration area (power measuring area) at the innermost circumference. Further, test-writing (OPC: optimum power control) corresponding to multiple linear velocities is described in Japanese Patent Application Laid-Open (JP-A) Nos. 2000-163850, 2002-358642, 2003-016651, and others. For example, in JP-A No.2002-358642, there is described that an OPC zone (test-writing area) is provided on the high-speed recording side at the boundary of the recording area in each zone in ZCLV format. According to this invention, test-writing becomes possible at a recording velocity of each zone. However, correction of OPC is not described.

On the other hand, with recent speeding-up of velocity at which data are recorded in an optical disc, it sometimes happens that in the midst of recording data in an optical disc, the transferring velocity at which data to be recorded are transferred from a host computer becomes slower than the velocity at which the data are recorded in the optical disc. This status where data to be recorded run out is called buffer under-run. Recent optical disc devices are, in many cases, provided with a means for protecting recording called as "BURN-Proof" "Just link" or the like. With the help of this means for protecting recording, writing interrupts and holds its state for a while when buffer under-run comes up. After interruption, when the transferring velocity of data becomes large or data to be written are stored in sufficient quantity in a buffer memory, the interruption is unlocked and writing starts again. In this way, an optical disc is not wasted on the occasion of buffer under-run.

In the case of employing the above-mentioned means for protecting recording, in order to restart writing without fail at the address interrupted, it is required that the rotation of an optical disc and the timing of writing data be synchronized before writing starts again. In one synchronizing method used, the position of an optical pickup is relocated back to the address before the interrupted address and the data so far written are read at the same velocity as the one at which the data were written, and in this way, an EFM signal is obtained. On the other hand, another EFM signal on the writing side is generated inside an encoder; then, these two signals are combined and are used to get synchronization.

Examples of publicly known technologies on an optical recording medium which uses dye in its recording layer are listed as: in one example, a polymethine dye or a combination of a polymethine dye and a photo-stabilizing material is used for recording material; in another example, a recording layer comprises a layer containing a combination of a tetraazaporphyrin (porphyrazin) dye or a cyanine dye+an azo-metal chelate dye (salt forming dye) and a reflecting layer; in still another example, a combination of a formazan (metal chelate) dye + other dyes is used for recording material; and in still another example, a combination of a dipyrromethene (metal chelate) dye + other dyes is used for a recording material. They are too many to be listed here. Further, many examples are known where a dye is used for recording material which is subject to multi-pulse recording. However, to the knowledge of the present inventors, no document has been found which recognizes the importance of a power controlling method used in a linking stage where a recording velocity of a dye-based recordable DVD medium is switched to a highest linear recording velocity, or the importance of a recording waveform on high linear velocity recording.

It is an object of the present invention to provide a recording and reproducing method for a dye-based recordable DVD medium and an apparatus thereof wherein an excellent recording waveform is obtained on high linear velocity recording. Particularly it is an object of the present invention to provide a simple power controlling method used in a linking stage where a recording velocity for a recordable DVD medium compatible with high linear velocity is switched to a highest linear recording velocity.

Further, it is also an object of the present invention to provide a new method for formatting a recordable DVD system using a semiconductor laser which has an oscillation wavelength shorter than that for a CD medium system. The new method is an effective method in which unrecorded areas are eliminated from a data adding zone in the same manner as LPP (Land Pre-Pit) method. Also the new method is an excellent method in which no data error is produced by fine trimming of cutting width in the production of stampers or by leakage of LPP signals into a data zone, as compared with the DVD-R Land Pre-Pit method.

SUMMARY OF THE INVENTION

In order to achieve the above-mentioned objects, there is provided the is following <1> through <13> invention (hereinafter referred to as the present invention 1 through 13).

<1> A method for recording and reproducing comprising:
starting recording a recordable DVD medium under the condition of a CLV linear velocity other than the highest linear velocity at the innermost circumference,
wherein the recordable DVD medium comprises a recording layer containing an organic dye; and a disc-form substrate having a guide groove provided with wobble, wherein a recording condition for a CLV highest linear velocity and a recording condition for a CLV linear velocity other than the highest linear velocity are coded and recorded in advance at a given position of the substrate;
performing test-writing in a power calibration area at the outermost circumference so as to obtain an optimum recording power of Po at a highest linear velocity when switchover to recording with the highest linear velocity is performed at a radial position where rotation at the highest linear velocity becomes attainable; and
restarting recording under the condition of the highest linear velocity and the recording power set by a result of comparison which is made between the optimum recording power of Po at the highest linear velocity that is temporarily optimized by the test-writing and an optimum recording power of Pi at the highest linear velocity that is coded and recorded in advance in the substrate;
in the case of Po>Pi, a recording power given by the formula of (Po+Pi)/2+(Po−Pi)$^2$/Pi is employed as a recording power with which recording starts at the highest recording velocity, and in the case of Po≦Pi, Pi is employed as a recording power with which recording starts at the highest linear velocity.

<2> A method for recording and reproducing as described in <1>, wherein a shortest mark is always recorded by one pulse-light having a power of W0; a second shortest mark is recorded by one pulse-light having either a power of W0, a power of W1 which is lower than W0, or a power which has a base power of W2 lower than W1 and is enhanced to W0 or W1 for a given duration at the front and/or rear edges of the pulse-light; a third shortest and longer marks are recorded by one pulse-light having a power which has a base power of W2 and is enhanced to W0 or W1 for a given duration at the front and/or rear edges of the pulse-light; in the course of recording a mark, a cooling pulse is irradiated after the rear edge of the above-described pulse-light for every mark; and the irradiating light quantity of the cooling pulse is set at 0.1 mW or less for a given duration.

<3> A method for recording and reproducing as described in one of <1> and <2>, wherein the irradiation time of the cooling pulse after the rear edge of the pulse-light is set to be ⅙ to ⅚ of the length of a shortest space.

<4> A method for recording and reproducing as described in one of <1> through <3>, wherein the heating pulse width of a recording pulse which forms a mark having the immediately preceding space whose length is the shortest is determined based on whether the length of the mark is the shortest or not, wherein the heating pulse width for the mark having the shortest length is set longer at the front end than the heating pulse width of a mark whose length is not the shortest; and the heating pulse width of a recording pulse which forms a mark having the shortest length is determined based on whether the length of a space immediately preceding the mark whose length is the shortest is the shortest or not, wherein the heating pulse width of a mark having the immediately preceding space whose length is the shortest is set shorter at the front end than the heating pulse width of a mark having the immediately preceding space whose length is not the shortest.

<5> A method for recording and reproducing as described in any one of <1> through <4>, wherein the above-described wobble has a frequency of 4T to 96 T on the basis of a basic clock cycle of T.

<6> A method for recording and reproducing as described in any one of <1> through <5>, wherein the wavelength of a recording light is 600 nm to 720 nm.

<7> A method for recording and reproducing as described in any one of <1> through <6>, wherein a single recording layer has a refractive index (n) of 1.5≦n≦3.0 and an extinction coefficient (k) of 0.02≦k≦0.2 for light of wavelength of recording and reproduction light ±5 nm.

<8> A method for recording and reproducing as described in any one of <1> through <7>, wherein the recordable DVD medium has, as a constituent layer other than a recording layer, one or more layers selected from a reflective layer, a protective layer, an adhesive layer, a protective substrate and a hard-coating layer on the substrate surface.

<9> A method for recording and reproducing as described in <8>, wherein an adhesive layer, which forms a two-sided recording medium by bonding together two substrates either one of which has a guide groove provided with wobble, is placed between the two substrates, and an adhesive used for the adhesive layer is a UV-setting resin.

<10> An apparatus for recording and reproducing comprising:

a recording and reproducing device recording and reproducing a dye-based recordable DVD medium, wherein the recordable DVD medium comprises substrate having a guide groove provided with wobble, wherein a recording condition for a CLV highest linear velocity and a recording condition for a CLV linear velocity other than the highest linear velocity are coded and recorded in advance at a given position of the substrate, wherein recording starts at a CLV linear velocity other than the highest linear velocity at the innermost circumference, test-writing is performed in a power calibration area at the outermost circumference so as to obtain an optimum recording power of Po at a highest linear velocity when switchover to recording with the highest linear velocity is performed at a radial position where rotation at the highest linear velocity becomes attainable, and recording restarts under the condition of the highest linear velocity and the recording power set by a result of comparison which is made between the optimum recording power of Po at the highest recording velocity that is temporarily optimized by the test-writing and an optimum recording power of Pi at the highest recording velocity that is coded and recorded in advance in the substrate;

in the case of Po>Pi, a recording power given by the formula of (Po+Pi)/2+(Po−Pi)$^2$/Pi is employed as a recording power with which recording starts at the highest linear velocity; and in the case of Po≦Pi, Pi is employed as a recording power with which recording starts at the highest linear velocity.

<11> An apparatus for recording and reproducing as described in <10>, wherein a shortest mark is always recorded by one pulse-light having a power of W0; a second shortest mark is recorded by one pulse-light having a power of W0, a power of W1 which is lower than W0, or a power which has a base power of W2 lower than W1 and is enhanced to W0 or W1 for a given duration at the front and/or rear edges of the pulse-light; a third shortest and longer marks are recorded by one pulse-light having a power which has a base power of W2 and is enhanced to W0 or W1 for a given duration at the front and/or rear edges of the pulse-light; in the course of recording a mark, a cooling pulse is irradiated after the rear edge of the above-described pulse-light for every mark; and the irradiating light quantity of the cooling pulse is set to 0.1 mW or less for a given duration.

<12> An apparatus for recording and reproducing as described in one of <10> and <11>, wherein the irradiation time of the cooling pulse after the rear edge of the pulse-light is set to be ⅙ to ⅔ of the length of a shortest space.

<13> An apparatus for recording and reproducing as described in any of <10> through <12>, wherein the heating pulse width of a recording pulse which forms a mark having the immediately preceding space whose length is the shortest is determined based on whether the length of the mark is the shortest or not, wherein the heating pulse width for the mark having the shortest length is set longer at the front end than the heating pulse width of a mark whose length is not the shortest; and the heating pulse width of a recording pulse which forms a mark having the shortest length is determined based on whether the length of a space immediately preceding the mark whose length is the shortest is the shortest or not, wherein the heating pulse width of a mark having the immediately preceding space whose length is the shortest is set shorter at the front end than the heating pulse width of a mark having the immediately preceding space whose length is not the shortest.

PREFERRED EMBODIMENT FOR CARRYING OUT THE INVENTION

Figure 1A:
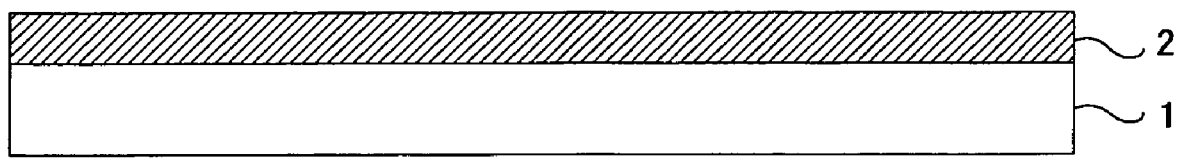
FIG. 1A is a drawing showing an example for the construction of layers of a conventional recordable optical recording medium.
Figure 1B:
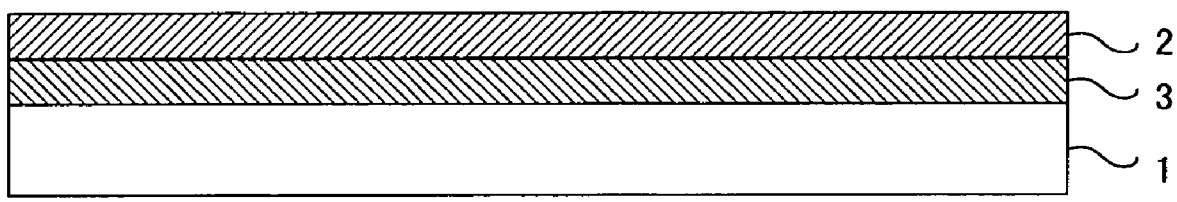
FIG. 1B is a drawing showing another example for the construction of layers of a conventional recordable optical recording medium.
Figure 1C:
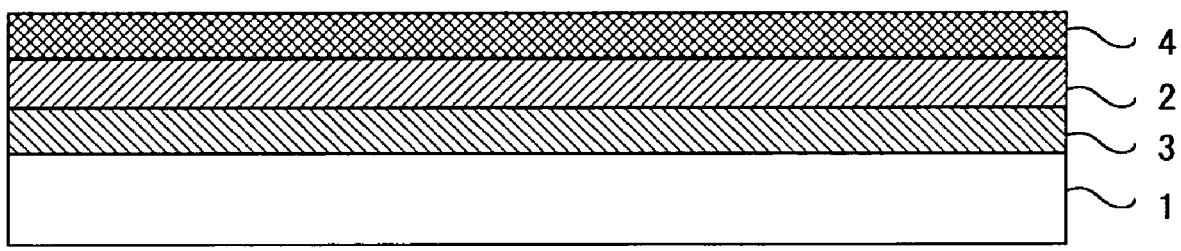
FIG. 1C is a drawing showing another example for the construction of layers of a conventional recordable optical recording medium.
Figure 1D:
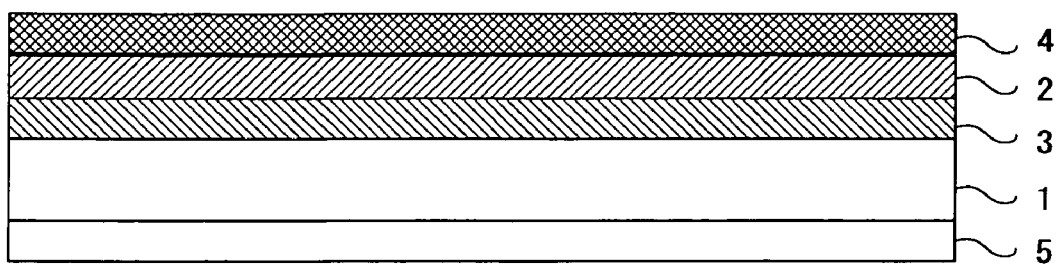
FIG. 1D is a drawing showing another example for the construction of layers of a conventional recordable optical recording medium.

The present invention is described below in detail.

As described above, an optimum recording power at a highest linear velocity Pi, that is coded and recorded in a substrate, sometimes deviates from an optimum recording power at a highest linear velocity Po, that is optimized by test-writing in a power calibration area at the outermost circumference when switchover of the linear velocity is performed. In an actual situation, in most cases, the temperature inside a writing drive increases and the wavelength of LD is shifted to longer wavelengths because of the intrinsic property of LD. On the other hand, a dye-based medium has absorption around a recording wavelength, so that an optimum recording power is increased particularly when the recording wavelength is shifted to longer wavelengths. That is, here comes a relation of Po>Pi.

Therefore, according to the present invention 1, a recording power given by the formula of $$(Po+Pi)/2+(Po-Pi)^2/Pi$$

is employed as the recording power on restarting recording when switchover of the linear velocity is performed, and then the recording power is optimized by Running OPC. In this way, recording quality can be kept good at a highest recording linear velocity, which is an object of the present invention.

In addition, in the case of Po≦Pi, which is a rather rare case, the difference in power between Po and Pi is small, so that recording quality can be also kept good by restarting recording with a power of Pi which is in advance coded and recorded in the substrate.

Hereinafter, the reason is explained why a recording power given by the formula of $$(Po+Pi)/2+(Po-Pi)^2/Pi$$

is employed in the case of Po>Pi as the recording power on restarting recording at a highest recording velocity.

In the above formula, the first term is simply the average of Po and Pi, and the second term is the square of the difference between Po and Pi which is normalized by a power that is coded and recorded. An optimum recording power is given by adding the latter to the average. Generally, a disc-form optical recording medium has a poor mechanical property at the outer circumference as compared with those at the inner or middle circumference, so that a higher recording power is required at the outer circumference as compared with at the inner or middle circumference in many cases. Thus, if a recording power which is obtained for the outer circumference is applied as it is to the middle circumference, there is a high probability of restarting recording with a power somewhat overshot. On the other hand, applying a simple average of Po and Pi may result in a power undershot. Therefore, by adding the second term to the average in accordance with the above-described formula, optimization of a recording power can be realized at the switchover of the recording linear velocity.

The present invention 2 defines a basic optimum pattern of irradiating pulses.

It is difficult for a shortest mark to form a pit by high linear velocity recording, so that the quantity of light of recording pulses is required to always have a highest power. When W0 is a pulse power for a shortest mark, W2 is a base power (without additional power) for a mark other than the shortest mark, and W1 is a power which is given by applied a additional power to W2, W0/W1 is preferably in the range of 1.01 to 2.00, more preferably in the range of 1.02 to 1.50. W1/W2 is preferably in the range of 1.05 to 3.00, more preferably in the range of 1.08 to 2.00.

For a mark other than the shortest mark, at the front and/or rear edges of a recording pulse, the length during which a power has an additional power for high output or the length during which a power is enhanced to W0 is particularly preferably in the range of 0.5 to 2 times of a basic clock cycle of T, that is 0.5 T to 2 T, still attainable even in the range of 0.2 T to 2.5 T.

Further, upon recording a mark, by setting the quantity of irradiating light of a cooling pulse after the above-described rear edge of a pulse to be 0.1 mW or less for a given duration, still higher recording quality can be attained. In addition, by detecting recording position with high-frequency wobble, recording with loss-less linking is attainable.

The above-mentioned pattern of irradiating pulses is a new formatting method for a recordable DVD system that uses a semiconductor laser having an oscillation wavelength in shorter wavelengths as compared with CD media, also an effective method for eliminating unrecorded areas from a data adding zone as in LPP method, and also, as opposed to DVD-R Land Pre-Pit method, an excellent method which is free of data errors caused by fine trimming of cutting width on the production of stampers or by leakage of LPP signals into a data zone.

The present invention 3 defines a preferable condition of irradiating a cooling pulse which is provided after the rear edge of each pulse. The irradiation time of the cooling pulse is preferably ⅙ to ⅚ of the length of a shortest space. Outside of this range it becomes difficult to obtain an effect of cooling pulse.

By selecting the above-described pulse waveform, particularly in high linear velocity recording, excellent recording with low jitter can be attained.

A dye-based optical recording medium is required to have a high recording power at a high linear velocity, and thereby thermal interference among marks is more easily produced. Then, in order to obtain good cutting edges for marks when they are produced, the present invention becomes effective.

When recording is carried out in accordance with conventional examples, a power margin is decreased since a difference between a power at which the lowest jitter is obtained and a power at which error becomes lowest is generated. Specifically, in high linear velocity recording, asymmetry of signals to be recorded is liable to shift to the minus side at a recording power which provides the lowest jitter, so that error tends to easily occur even if lower jitter is obtained on error measurement. For example, even if the asymmetry is on the minus side and both jitter and error are low, error tends to be easily produced due to aging of a medium or a drive as compared with a medium which is recorded at the asymmetry of around zero. The present invention has been accomplished to solve the above-mentioned problem of low asymmetry.

Further, in the case of recording one mark with a plurality of pulses of light (multi-pulse), it is possible to solve the above-mentioned problem of low asymmetry if the light pulse is optimized. However, scattering in the pulse-rising duration and pulse-falling duration of light-pulses may result in fluctuation of recording quality itself because plurality of pulses are used. It goes without saying that this fluctuation tends to be more easily produced in recording at higher linear velocity.

In contrast, in the present invention, one mark is recorded with one pulse light, so that the present invention has an advantage of providing a recording method with reduced fluctuation in recording quality as compared with the above-mentioned method of multi-pulse optical recording. Further, on detecting an address in the course of writing, the present invention also has an advantage of carrying out address detection relatively easily even if a cooling pulse with a power of 0.1 mW or less is provided at the rear edge of a pulse for recording. This is because that a simpler waveform is used in the present invention as compared with the multi-pulse optical recording, and that the quantity of light for recording can be easily equalized; that is, it becomes possible to detect an address by equalizing the quantity of light for marks as well as the quantity of reflective light for spaces.

By taking thermal interference into consideration, the heating pulse width of a recording pulse which forms a mark whose immediately preceding space has a shortest length is determined based on whether the length of the mark is the shortest or not, wherein the heating pulse width for the mark having the shortest length is set longer at the front end than the heating pulse width of a mark whose length is not the shortest. (An example is referred to the case described below in Table 1, where the length of immediately preceding space is 3 T and the length of mark to be recorded is 3 T or 4 T to 14 T.) Thereby, recording with lower jitter can be realized.

Further, the heating pulse width of a recording pulse which forms a mark having the shortest length is determined based on whether the length of a space immediately preceding the mark whose length is the shortest is the shortest or not, wherein the heating pulse width of a mark having the immediately preceding space whose length is the shortest is set shorter at the front end than the heating pulse width of a mark having the immediately preceding space whose length is not the shortest. (An example is referred to the case described below in Table 1, where the length of mark to be recorded mark length is 3 T and the space length is 3 T or 4 T to 14 T.) Thereby, recording with still lower jitter can be realized.

The amount of correction (length) to set the above-described heating pulse width to be short is particularly preferably 0.02 T to 0.10 T. When the length of a space immediately preceding a mark to be formed is the shortest, and the width of a pulse which forms the mark is nearly equal to that of a pulse which forms other marks, the length of the immediately preceding space becomes shorter by thermal interference, thereby jitter becomes somewhat worse. Only in this case, therefore, it can be effective to make shorter the width of a heating pulse which is used to record a mark. Further, when a shorter pulse width is required, it is needless to say that it can be effective to make the front edge of a heating pulse shorter.

In addition, when the length of a space immediately preceding a mark to be formed is the shortest, and if the heating pulse width of a pulse which forms the mark is shorter than 0.10 T, the length of the mark itself may become too short. This is not favorable.

When the heating pulse width of a shortest mark is set longer than other marks, the amount of correction (length) is preferably 0.05 T to 0.25 T. Particularly, when a recording linear velocity becomes larger, the shortest mark becomes difficult to be formed, so that the heating pulse width of the shortest mark is set longer by correcting it within the above-described range.

Specific examples of the amounts of correction for a heating pulse width are given in the following Table 1.

TABLE 1

| | | Length of a mark to be recorded | |
|---|---|---|---|
| | | 3 T | 4 T to 14 T |
| Length of the immediately preceding space | 3 T | ±0.00 T | −0.05 T |
| | 4 T to 14 T | +0.05 T | ±0.00 T |

Next, optical properties are listed as an item necessary for a recording layer.

As optical properties, a single recording layer preferably has a refractive index (n) of $1.5 \leq n \leq 3.0$ and an extinction coefficient (k) of $0.02 \leq k \leq 0.2$, for light in a wavelength range around longer wavelengths around the recording/reproduction wavelength, that is, for light of the wavelength of recording/reproduction light ±5 nm. Values of n less than 1.5 are not desirable, because sufficient optical change is difficult to be obtained and recording modulation becomes too low. Values of n larger than 3.0 are not desirable either, because the wavelength dependence becomes too large and an error will be brought about even within the range of recording/reproduction wavelength. Further, values of k less than 0.02 are not desirable, because recording sensitivity becomes worse. Values of k larger than 0.2 are not desirable either, because it becomes difficult to obtain a reflectance of 50% or more.

DVD is standardized at wavelength around 650 nm for playback-only machines, however, the wavelength of recording light for recordable media is standardized not only at 635 nm for authoring-only machines but also at 650 nm to 660 nm for machines of general purposes. These wavelengths are just a central wavelength and are shifted to the shorter or longer wavelengths depending on production tolerance of LDs. Also, the wavelength of LDs is shifted to the longer wavelengths with increase of temperature in general in accordance with the intrinsic property of LDs. The present invention can be carried out in a range of recording wavelength of 600 nm to 720 nm which includes the above-described wavelength ranges.

Hereinafter wobble property of a meandering guide groove formed in a substrate is described. "T" which specifies wobble frequency is a basic clock cycle, and is about 0.133 μm, that is, about 38 nsec. in terms of time for a DVD (4.7 GB) medium.

Generally, a band corresponding to 150 T to 400 T is used as a wobble frequency band, but this frequency band is not suitable for high density recording when data are added by an appropriate method such as frequency modulation or phase modulation. This is because the wobble frequency is too low and the blank interval between prior data and added data becomes too long. To meet this inconvenience, DVD-R is installed with LPP, whose signals are used to control the writing position of data.

However, in the LPP method, LPP cannot be read out without failure when the amplitude of LPP signals is too small, and to the contrary, too large LPP signals bring about inconvenience of frequent data error caused by leakage of LPP signals themselves into the data recorded. For the reason described above, LPP is limited as $0.16 \leq LPPb \leq 0.32$, preferably $0.18 \leq LPPb \leq 0.26$, so that the cutting width of a land should be precisely controlled in the production of stampers.

As opposed to the above, high-frequency wobble does not need LPP and acquires synchronization by modulating wobble, so that the frequent data error encountered in the LPP method can be avoided. As defined in the present invention 5, suitable wobble frequency is 4 T to 96 T. A frequency smaller than 4 T is too high to be detected, causing also problems in rotation control or reliability on address detection. On the other hand, a frequency larger than 96 T is too low and makes the linking interval on adding recording too long, causing problems of reduction in recording capacity or data processing speed.

As to the amplitude of wobble of a DVD medium to which the present invention is directed, synchronization with wobble (which is an object of the present invention) can be easily attained when Wo/PP is 0.1 to 0.4, more preferably 0.15 to 0.30; wherein Wo is a wobble amplitude for a signal after passing through an appropriate filter, for example, a high/low-pass filter of 4 MHz and 30 kHz; PP is an amplitude of a push-pull signal after passing through an appropriate filter, for example, of 30 kHz. When the value of Wo/PP is less than 0.1, the signal strength is not enough to acquire synchronization. When the value is more than 0.4, error is liable to increase in the data zone. However, as compared with the LPP method, the effect on data-error generation for a medium having a large LPP is small, and data-error associated with the increase of wobble amplitude is moderate.

In addition, in the production of stampers, the LPP method requires a high technology of controlling cutting width to keep the LPP cutting width within the above-described range of 0.16 to 0.32, but the method of high-frequency wobble can attain the object of the present invention only by controlling a high-frequency wave generator and a swinging magnitude of wobble (a desired swinging magnitude can be produced with good reproducibility with the help of a circuit which controls the swinging magnitude of wobble), so that the yield of stampers or that of media can be substantially improved.

As for the groove dimension of a substrate having the above-described format, for example in the case of forming a recording layer using an organic dye by the solvent coating process, a preferred groove depth is 1000 angstroms to 2500 angstroms, more preferably 1500 angstroms to 2000 angstroms. At a depth less than 1000 angstroms, acquisition of push-pull signals is not enough and tracking control is not attainable. A depth more than 2500 angstroms is not preferred, because transferring becomes dull when a substrate is molded.

Further, in the case where a dye-based recording layer is provided, the is depth of a dye groove is preferably in the range of $1200 \leq d1 \times m \leq 160000$; wherein mT is the wobble frequency (m is a natural number) and d1 is the depth of dye groove. When the value of $d1 \times m$ is less than 1200, satisfactory differential signals may not be obtained and satisfactory tracking is not performed on recording/reproduction. When the value of $d1 \times m$ is more than 160000, oscillation may be induced to the contrary, which may adversely affect the tracking. In addition, because the depth of substrate groove is limited by the above-mentioned transferring limit on molding the substrate, the value of $d1 \times m$ is limited to no more than 160000 in practice.

Further, a track pitch of 0.64 μm to 0.8 μm is required for assuring a capacity of the recording density of 4 GB to 5 GB. The groove width depends on the recording material, but a half width of 0.18 μm to 0.40 μm can be used in almost all of organic materials.

Hereinafter are described constructions of layers, properties required for each layer, and construction materials of a dye-based recordable DVD medium to which the present invention is directed.

Figure 2A:
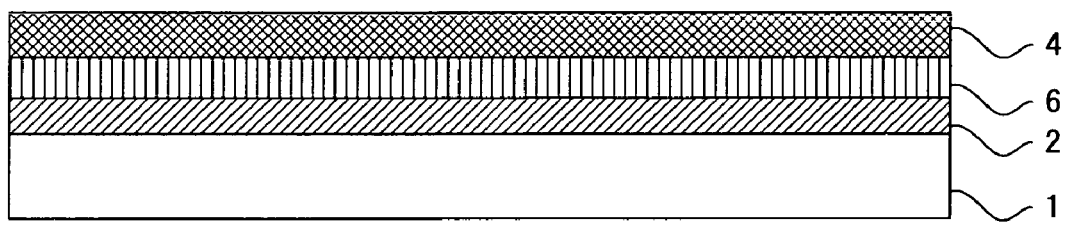
FIG. 2A is a drawing showing an example for the construction of layers of a conventional CD-R medium.
Figure 2B:
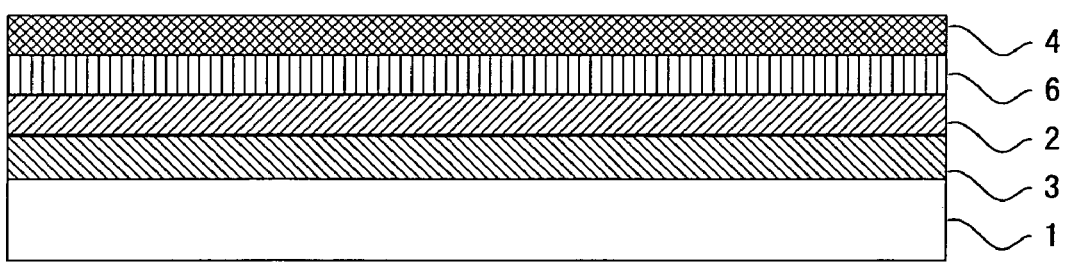
FIG. 2B is a drawing showing another example for the construction of layers of a conventional CD-R medium.
Figure 2C:
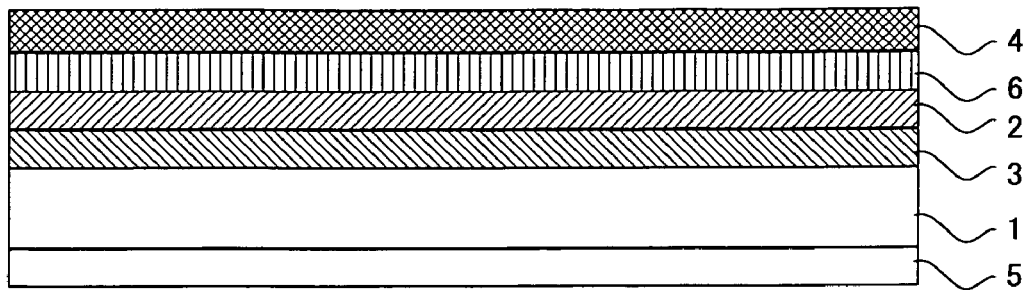
FIG. 2C is a drawing showing another example for the construction of layers of a conventional CD-R medium.
Figure 3A:
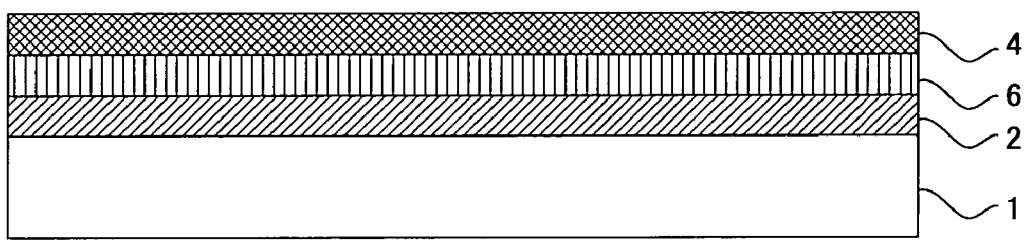
FIG. 3A is a drawing showing an example for the construction of layers of a dye-based recordable DVD medium.
Figure 3B:
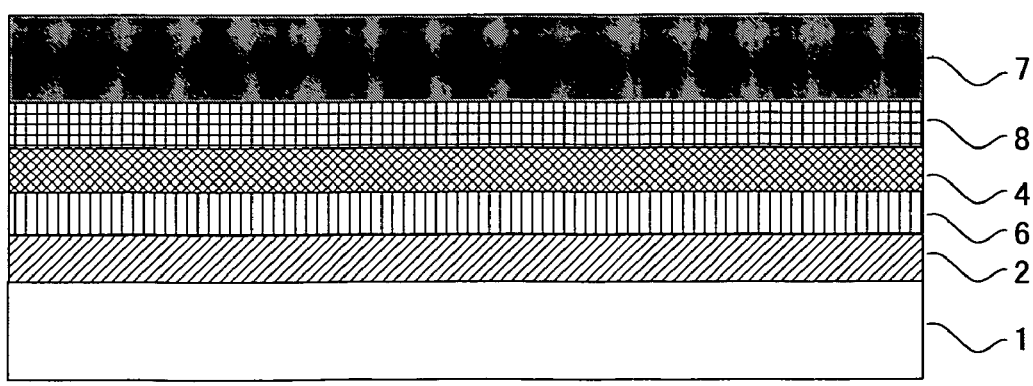
FIG. 3B is a drawing showing another example for the construction of layers of a dye-based recordable DVD medium.
Figure 3C:
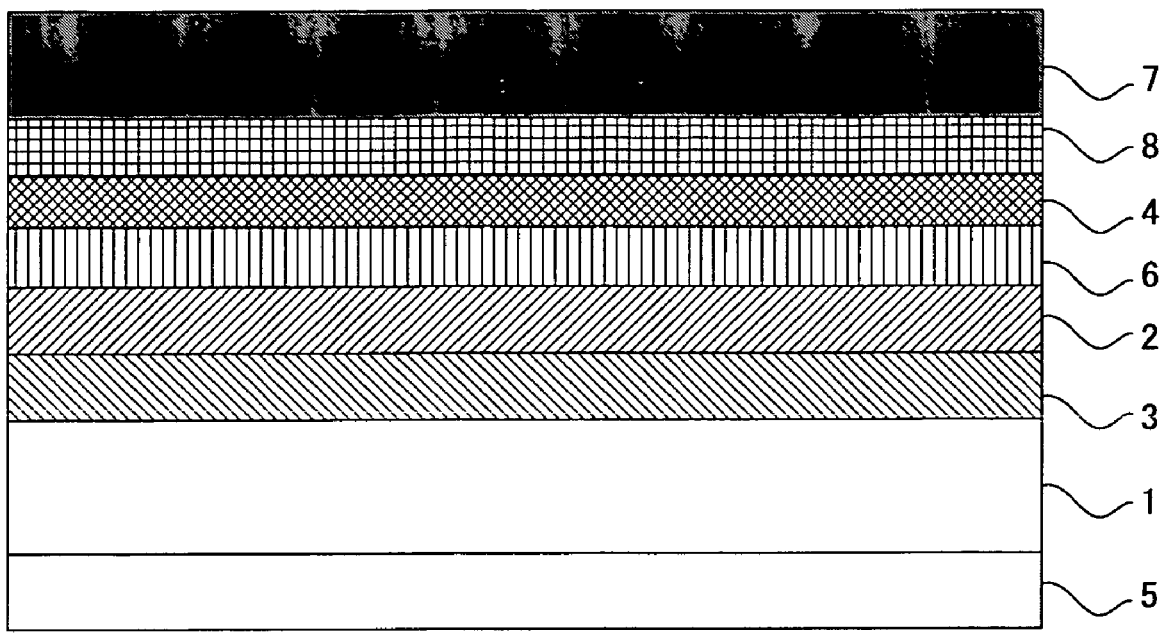
FIG. 3C is a drawing showing another example for the construction of layers of a dye-based recordable DVD medium.
Figure 4:
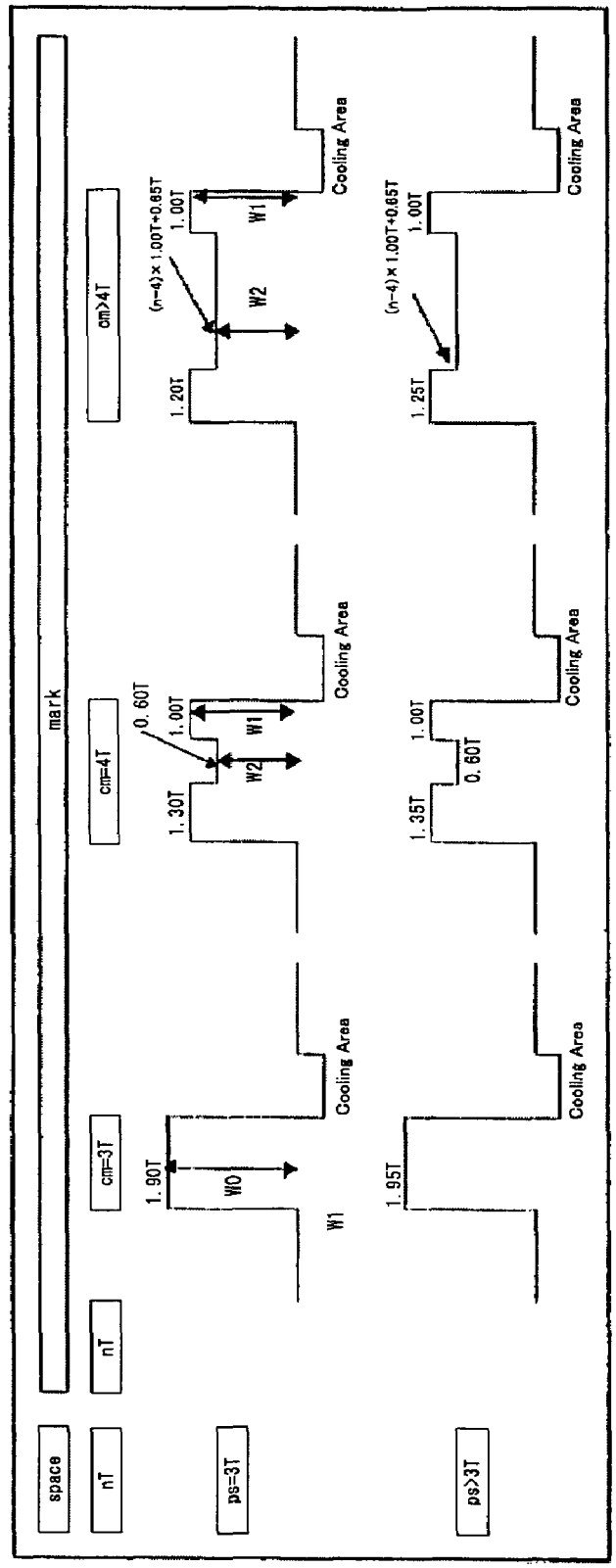
FIG. 4 is a diagram showing example 1 of a waveform for power control used at a recording linear velocity of 28 m/s in accordance with the present inventions 2 and 3.

FIGS. 1A, 1B, 1C, and 1D are examples for constructions of layers of conventional recordable optical discs; FIGS. 2A, 2B, and 2C are examples for constructions of layers of conventional CD-R media; and FIGS. 3A, 3B, and 2C are examples of recordable DVD media. A preferred basic construction of a dye-based recordable DVD medium to which the present invention is directed is the one as shown in FIGS. 3B and 3C, where a first substrate 1 and a second substrate 2 (a protective substrate 7) are bonded together with an adhesive in such a manner that a recording layer 2 is placed between these two substrates. In FIGS. 1A, 1B, 1C, 1D, 2A, 2B, 2C, 3A, 3B, and 3C (including the numbers attached to each lead line): "1" indicates substrate; "2," indicates recording layer; "3" indicates undercoat layer; "4" indicates protective layer; "5" indicates hard-coating layer; "6" indicates reflecting layer; "7" indicates protective substrate; and "8" indicates adhesive layer.

The recording layer can be a single organic dye layer or can be a laminated layer of an organic dye layer and a reflective layer so as to enhance reflectance. Between recording layer 2 and substrate 1 or protective substrate 7, undercoat layer 3 or protective layer 4 can be incorporated. In order to obtain an improved performance, two or more of each layer can be superimposed to form a laminated structure. A structure commonly used has the following configuration: first substrate 1/organic dye layer (recording layer 2)/reflecting layer 6/protective layer 4/adhesive layer 8/second substrate (protective substrate 7). In addition, a hard-coating layer 5 can be added.

Substrate:

A substrate is required to be transparent to laser used when recording and reproduction is performed from the side of the substrate, but the substrate is not required to be transparent when recording and reproduction is performed from the side of a recording layer. As a substrate material can be used, for example, plastics such as polyester resin, acrylic resin, polyamide resin, polycarbonate resin, polyolefin resin, phenol resin, epoxy resin, or polyimide resin; glass; ceramics; or metal. On the surface of a substrate can be formed a guide groove or a guide pit for tracking, further can be formed a preformat such as an address signal.

Recording Layer:

Information is recorded on a recording layer through an optical change caused by laser beam irradiation. A material containing organic dye is used for the recording layer. The organic dye can be contained in an amount needed for recording and reproduction. It is preferred that the organic dye is contained in an amount of 50 wt % or more with respect to the recording layer. Generally an organic dye is solely used except for a small amount of additives that are optionally added.

Examples of organic dyes include azo, formazan, dipyrromethene, (poly)methine, naphthalocyanine, phthalocyanine, tetraazaphorphyrn, squarylium, croconium, pyrylium, naphthoquinone, anthraquinone (indanthrene), xanthene, triphenylmethane, azulene, tetrahydroccorrin, phenanthrene, and triphenothiazine dyes, or metal salts thereof. Among them are preferable azo (metal chelate) dyes, formazan (metal chelate) dyes, squarylium (metal chelate) dyes, dipyrromethene (metal chelate) dyes, trimethine cyanine dyes, and tetraazaporphyrin dyes.

As a thermal decomposition property, the above-described dyes have preferably the initial decomposition temperature of 100° C. to 360° C., particularly preferably 100° C. to 350° C. At the initial decomposition temperature of more than 360° C., pit formation becomes poor on recording and this results in poor jitter performance. When it is less than 100° C., storage stability of discs becomes poor.

In order to improve optical properties, recording sensitivity, and signal properties, other organic dyes, metals, or metal compounds can be mixed with the above-described dyes, or a layer of these dyes can be laminated with a layer which contains the other organic dyes, metals, or metal compounds.

Examples of these metals or metal compounds include In, Te, Bi, Se, Sb, Ge, Sn, Al, Be, $TeO_2$, SnO, As, or Cd. They are each used in a manner of dispersive mixing or laminating.

Further, with the above-described dyes can be dispersed and admixed polymer materials, for example, ionomer resin, polyamide resin, vinyl resin, natural polymer, silicone, or liquid rubber; or a silane coupling agent. In addition, in order to improve performance, stabilizers (for example, transition metal complex), dispersants, flame retardants, lubricants, antistatic agents, surfactants, or plasticizers can be used in combination.

A recording layer can be formed by conventional methods such as vapor-deposition, sputtering, CVD, or solvent coating. In the case of using the coating method, the above-described dyes and others are dissolved in an organic solvent, and then coating is performed in conventional ways such as spray coating, roller coating, dip coating, or spin coating. Examples of the organic solvents generally include alcohols such as methanol, ethanol, or isopropanol; ketones such as acetone, methylethylketone, or cyclohexanone; amides such as N,N-dimethylformamide or N,N-dimethylacetoamide; sulfoxides such as dimethylsulfoxide; ethers such as tetrahydrofuran, dioxane, diethyl ether, or ethylene glycol monomethyl ether; esters such as methyl acetate or ethyl acetate; aliphatic halogenated hydrocarbons such as chloroform, methylene chloride, dichloroethane, carbon tetrachloride, or trichloroethane; aromatic compounds such as benzene, xylene, monochlorobenzene, or dichlorobenzene; cellosolves such as methoxyethanol or ethoxyethanol; or hydrocarbons such as hexane, pentane, cyclohexane, or methylcyclohexane.

The thickness of the recording layer is 100 angstroms to 10 µm, preferably 200 angstroms to 2000 angstroms.

Undercoat Layer:

An undercoat layer is incorporated for the purpose of (1) improvement of adhesion; (2) barrier against water or gas; (3) improvement of storage stability of a recording layer; (4) improvement of reflectance; (5) protection of substrates against solvent; (6) forming guide grooves, guide pits, or preformats; and others. For the purpose of (1), various kinds of polymer compounds can be used, including ionomer resin, polyamide resin, vinyl resin, natural resin, natural polymer, silicone, and liquid rubber; or a silane coupling agent. For the purposes of (2) and (3), inorganic compounds can be used, such as SiO, MgF, $SiO_2$, TiO, ZnO, TiN, or SiN besides the above-described polymer compounds, further a metal or a semimetal can be used, such as Zn, Cu, Ni, Cr, Ge, Se, Au, Ag, or Al. For the purpose of (4), metals such as Al, Au, or Ag; or an organic thin film having metallic luster composed of methine dyes or xanthene dyes can be used. For the purposes of (5) and (6), UV-setting resin, thermosetting resin, or thermoplastic resin can be used.

The thickness of the undercoat layer is 0.01 µm to 30 µm, preferably 0.05 µm to 10 µm.

Reflecting Layer:

Examples of material for a reflecting layer include an elemental metal or semimetal such as Au, Ag, Cr, Ni, Al, Fe, or Sn, which has a high reflectance and is resistant to corrosion. In view of reflectance and productivity, Au, Ag, and Al are particularly preferred. These metals or semimetals can be used solely or in a combination of two or more kinds in the form of an alloy.

Vapor deposition or sputtering is used for forming a film of the above material. The thickness of the film is 50 angstroms to 5000 angstroms, preferably 100 angstroms to 3000 angstroms.

Protective Layer, Hard-coating Layer on Substrate Surface:

A protective layer and a hard-coating layer on substrate surface are used for the purpose of (1) protection of a recording layer (a reflection/absorption layer) from scarring, dust, staining, and others; (2) improvement of storage stability of a recording layer (a reflection/absorption layer); (3) improvement of reflectance; and others. For these purposes, the same material as that for an undercoat layer described above can be used. Further, it is possible to use an organic material such as a heat-softening or hot-melt resin including poly(methyl acrylate) resin, polycarbonate resin, epoxy resin, polystyrene resin, polyester resin, cellulose resin, aliphatic hydrocarbon resin, natural rubber, styrene-butadiene resin, chloroprene rubber, wax, alkyd resin, drying oil, rosin, and others. Most preferred is UV-setting resin which provides an excellent productivity.

The thickness of the protective layer or the hard-coating layer on substrate surface is 0.01 µm to 30 µm, preferably 0.05 µm to 10 µm.

In the above-described undercoat layer, protective layer, and hard-coating layer, stabilizer, dispersant, flame-retardant, lubricant, antistatic agent, surfactant, or plasticizer can be contained as in the recording layer.

Protective Substrate:

A protective substrate is required to be transparent for the laser light used when laser beam is irradiated from the side of the protective substrate, but the protective substrate is not required to be transparent when it is used simply as a protective plate.

A material usable for the protective substrate is totally the same as the material for the substrate described above, and a plastics such as polyester resin, acrylic resin, polyamide resin, polycarbonate resin, polyolefin resin, phenol resin, epoxy resin, or polyimide resin; glass; ceramics; metal; and others can be used.

Adhesive Layer:

As a material for an adhesive layer, any material which is capable of bonding two sheets of recording medium together can be used. Taking productivity into consideration, UV-setting adhesive or hot-melt adhesive is preferred.

A recording and reproducing apparatus according to the present invention will be described below.

An optical disc is used as a device for recording a large amount of information. An optical disc is usually recorded or reproduced by an optical disc drive (recording and reproducing apparatus). The constructions of an optical disc and an optical disc drive are briefly described.

DVD-RAM'WO, DVD-R, DVD+R, DVD-RAM, DVD-RW, and DVD+RW are recordable DVDs (Digital Versatile Disc). DVD-RAM'WO, DVD-R, and DVD+R are DVDs which can be recorded only one time and are also called as DVD Write-Once. DVD-RAM, DVD-RW, DVD+RW are DVDs which can be recorded repeatedly for a plurality of times. Recording and reproducing of information on an optical disc of these DVD+R and DVD+RW are performed with a drive as shown in FIG. 11.

Figure 11:
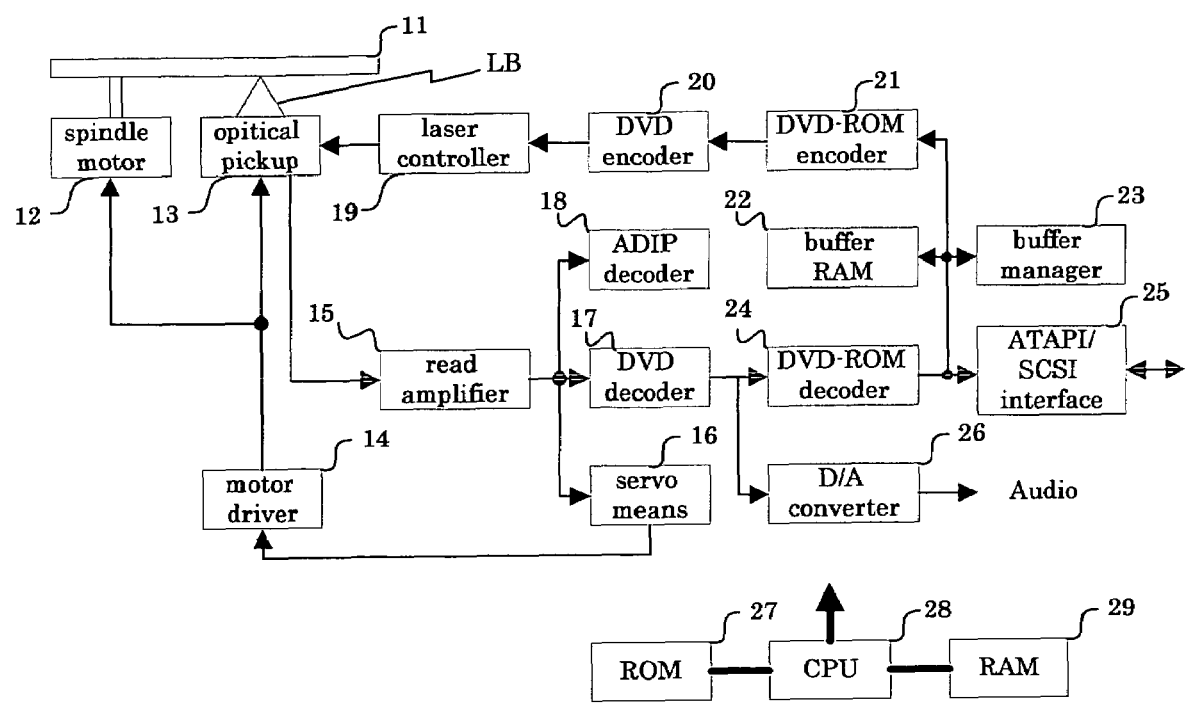
FIG. 11 is a functional block diagram showing an example of a construction of relevant edges of an optical disc drive.

FIG. 11 is a functional block diagram showing an example of a construction of relevant edges of an optical disc drive. In the figure: 11 indicates optical disc, 12 indicates spindle motor, 13 indicates optical pickup, 14 indicates motor driver, 15 indicates read amplifier, 16 indicates servo means, 17 indicates DVD decoder, 18 indicates ADIP decoder, 19 indicates laser controller, 20 indicates DVD encoder, 21 indicates DVD-ROM encoder, 22 indicates buffer RAM, 23 indicates buffer manager, 24 indicates DVD-ROM decoder, 25 indicates ATAPI/SCSI interface, 26 indicates D/A converter, 27 indicates ROM, 28 indicates CPU, 29 indicates RAM, LB indicates laser beam, and Audio indicates audio output signal.

In FIG. 11, arrows show directions in which data mainly flow. In order to simplify the figure, only heavy-lines are attached to CPU 28 which controls each block shown in FIG. 11 and connections to each block are omitted. In ROM 27 is installed a control program which is written by a code decodable in CPU 28. When the power of an optical disc drive is switched on, the control program is loaded on a main memory (not shown in the figure), CPU 28 controls operation of each block described above in accordance with the control program and also stores data and others which are necessary for control temporarily in RAM 29.

The construction and operation of an optical disc drive are as follows. Optical disc 11 is rotated and driven by spindle motor 12. Spindle motor 12 is controlled by motor driver 14 and servo means 16 in a manner that linear velocity or angular velocity is kept to be constant. The linear velocity or angular velocity can be changed stepwise.

Optical pickup 13 houses a semiconductor laser, an optical system, a focus actuator, a track actuator, a photosensitive element, and a position sensor which are not shown in the figure, and irradiates laser beam LB onto optical disc 11. Further, optical pickup 13 is movable with a seek motor to the sledge direction. These focus actuator, track actuator, and seek motor are controlled in such a manner that the spot of laser beam LB is positioned at a desired location on optical disc 11 with the help of motor driver 14 and servo means 16 in accordance with signals from the photosensitive element and the position sensor.

On reading, after the reproduction signals read by optical pickup 13 are amplified and digitized with read amplifier 15, they are inputted into DVD decoder 17. The digitized input data are subject to 8/16 demodulation in the DVD decoder 17. Note that the recorded data are added up by 8 bits each and modulated (8/16 modulation), that is, 8-bit is converted to 16-bit in this modulation. A combined bit is attached in such a manner that the prior numbers of "1" and "0" become equal on average. This is called "Suppression of DC component," whereby slice level fluctuation of the DC cut reproduction signals is suppressed.

Demodulated data are subjected to deinterleave and error correction. Subsequently, these data are entered into DVD-ROM decoder 24, and further subjected to error correction again so as to increase reliability of data. The data subjected to double error-corrections are temporarily stored in buffer RAM 22 by buffer manager 23, and then the data accumulated as a unit of sector are transferred in a single spell to a host computer (not shown in the figure) through ATAPI/SCSI interface 25. In the case of music data, the data outputted from DVD decoder 17 are inputted into D/A converter 26, and then read out as an analogue audio output signal Audio.

On writing, the data sent from the host computer through ATAPI/SCSI interface 25 are temporarily stored in buffer RAM 22 by buffer manager 23. Subsequently, writing operation starts, but in this case, before writing it is required that a laser spot be located at a starting point of writing. For DVD+RW/+R, the starting point is given by wobble signal which is in advance recorded on optical disc 11 by meandering of tracks.

The above starting point is given by, instead of the wobble signal, Land Pre-Pit for DVD-RW/-R, and by Pre-Pit for DVD-RAM/RAM'WO.

An address information called ADIP (ADress In Pre-groove) is involved in the wobble signal in a DVD+RW/+R disc. The address information is read out by ADIP decoder 18. A synchronizing signal generated by this ADIP decoder 18 is inputted into DVD encoder 20 and enables data to be written in a right position on optical disc 11. After the data of buffer RAM 22 are attached with error-correction codes and are interleaved in DVD-ROM encoder 21 and DVD encoder 20, the data are recorded in optical disc 11 through laser controller 19 and optical pickup 13 with a recoding power and a recording waveform which are defined in the present invention.

In the present invention, "the radial position where rotation at a highest linear velocity becomes attainable" which differs from each medium is detected, and then the linear velocity on recording is switched over. Widely known methods can be used for this detection. Further, in the present invention, when switching to recording at a highest linear velocity is performed at "the radial position where rotation at a highest linear velocity becomes attainable," test-writing is temporarily performed in a power calibration area at the outermost circumference. At this time, operation of recording which is performed until "the radial position where rotation at a highest linear velocity becomes attainable" is reached is interrupted; and after the optical pickup is moved to the power calibration area at the outermost circumference, test-writing is performed so as to obtain an optimum recording power of Po at a highest linear velocity. Subsequently, the optical pickup is moved to "the radial position where rotation at a highest linear velocity becomes attainable," and the interrupted operation of recording is restarted.

Above-described switching of the linear velocity can be performed as follows, for example, by applying a conventional technique for eliminating buffer under-run. Recording is interrupted for a while when the scheduled address is reached at which the recording linear velocity is switched over to a highest velocity, the initial data to be recorded immediately after the linear velocity is switched over to the highest are temporarily stored in buffer memory 22. Here, the scheduled address at which the recording linear velocity is switched over should be set up at an address located slightly at outermore circumference than the address at which rotation is attainable at the highest recording linear velocity. At the same time, after pickup 13 is moved by encoder 20 to the outermost circumference, address detection is carried out to detect a power calibration area which is installed on the outermore circumference than the user area, and rotation restarts at a linear velocity larger than the one at which recording is interrupted in the power calibration area, that is, by controlling at the highest linear velocity rotation. Then, test-writing (OPC) is performed when rotation, recording frequency, and power calibration area come to satisfy desired conditions, thereby an actual optimum recording power of Po at the outermost circumference and at the highest linear velocity at that time can be obtained.

In the present invention, the above-mentioned Po is compared with another optimum recording power of Pi at the highest recording velocity that is coded and recorded in advance in the substrate, wherein, in the case of Po>Pi, a recording power which is given by the formula of $$(Po+Pi)/2+(Po-Pi)^2/Pi$$

is employed as a recording power with which recording starts at the highest recording velocity, and in the case of Po≦Pi, Pi is employed as a recording power with which recording starts at the highest recording velocity. In this way, a recording power at the highest recording linear velocity is given. Here, publicly known methods can be used to read out and store in advance a highest linear velocity recordable for a target medium, an optimum recording power at each linear velocity, and a recording waveform.

Further, by using the above-described conventional methods, a pickup is moved around an address where data writing restarts by an encoder, and then is recording at a highest linear velocity restarts after the rotation of disc and the timing of data writing are synchronized before data writing restarts. As described above, the data to be recorded are stored in a buffer memory, so that recording at the highest linear velocity becomes ready to be performed. An optical pickup is relocated before the position at which recording is interrupted, and then the data are read out at the highest linear velocity to obtain an EFM signal. Another EFM signal for the side where data are recorded is generated inside of an encoder. Then, these EFM signals are synchronized together to start recording at the highest linear velocity. In addition, phase detection can be made more easily at such a high wobble frequency as 4 T to 96 T, whereby a seam for recording can be formed in good condition.

A recording and reproducing apparatus according to the present invention 10 can realize high quality recording at high linear velocity, because the apparatus has the following function: on recording and reproduction of a dye-based recordable DVD medium, wherein wobble is provided in a guide groove of a substrate, a recording condition for a CLV highest linear velocity and a recording condition for a CLV linear velocity other than the highest linear velocity are in advance coded and recorded in the medium, recording starts at a CLV linear velocity other than the highest linear velocity at the innermost circumference; when the CLV linear velocity is switched to the highest linear velocity at the radial position where rotation at the highest linear velocity becomes attainable, a comparison is made between an optimum recording power of Po at the highest recording velocity that is temporarily optimized by test-writing in a power calibration area at the outermost circumference and an optimum recording power of Pi at the highest recording velocity that is coded and recorded in advance in the medium; in the case of Po>Pi, a recording power given by the formula of $$(Po+Pi)/2+(Po-Pi)^2/Pi$$

is employed as a recording power with which recording starts at the highest linear velocity; and in the case of Po≦Pi, Pi is employed as a recording power with which recording starts at the highest linear velocity.

Further, a recording and reproducing apparatus according to the present invention 11 can provide still further improved recording quality by the following function: a shortest mark is always recorded by one pulse-light having a power of W0; a second shortest mark is recorded by one pulse-light having a power of W0, a power of W1 which is lower than W0, or a power which has a base power of W2 lower than W1 and is enhanced to W0 or W1 for a given duration at the front and/or rear edges of the pulse-light; a third shortest and longer marks are recorded by one pulse-light having a power which has a base power of W2 lower than W1 and is enhanced to W0 or W1 for a given duration at the front and/or rear edges of the pulse-light; in the course of recording a mark, a cooling pulse is irradiated after the rear edge of the above-described pulse-light for every mark; and the irradiating light quantity of the cooling pulse is set at 0.1 mW or less for a given duration.

A recording and reproducing apparatus according to the present invention 12 can provide still further improved recording quality by employing more suitable range of a cooling pulse duration. This is because the apparatus according to the present invention has the following function: the irradiation time of the cooling pulse after the rear edge of the pulse-light is set to be ⅛ to ⅚ of the length of a shortest space.

Still further, a recording and reproducing apparatus according to the present invention 13 can realize high quality recording, that is, a performance with low jitter. This is because the apparatus according to the present invention has the following function: the heating pulse width of a recording pulse which forms a mark having the immediately preceding space whose length is the shortest is determined based on whether the length of the mark is the shortest or not, wherein the heating pulse width for the mark having the shortest length is set longer at the front end than the heating pulse width of a mark whose length is not the shortest; and the heating pulse width of a recording pulse which forms a mark having the shortest length is determined based on whether the length of a space immediately preceding the mark whose length is the shortest is the shortest or not, wherein the heating pulse width of a mark having the immediately preceding space whose length is the shortest is set shorter at the front end than the heating pulse width of a mark having the immediately preceding space whose length is not the shortest.

As for a method of getting address information, it is also possible to use is a method where address information is acquired from Land Pre-Pit or Pre-Pit.

Figure 12:
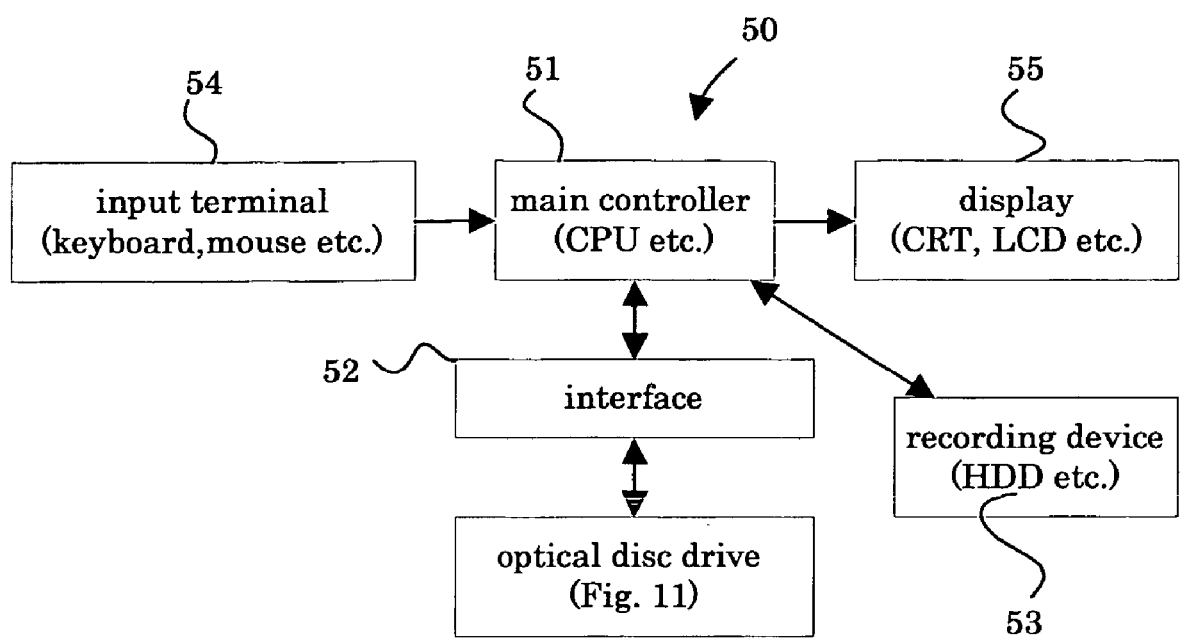
FIG. 12 is a schematic diagram of an information-processing device using an optical disc drive shown in FIG. 11.

FIG. 12 is a schematic diagram of an information-processing device using an optical disc drive shown in FIG. 11. The information-processing device is provided with a main controller, an interface, a recording device, an input terminal, a display device, and others.

The main controller includes a CPU (central processing unit or microcomputer) and a main memory (neither of them shown in the figure) and the like, and controls the whole of a host computer.

The interface is an interactive communication interface to the optical disc drive, and is in accordance with a standard interface such as ATAPI, SCSI, and others. The interface is connected to the aforementioned interface 25 of the optical disc drive. Interfaces can be connected not only by a cable connection using a communication cable (for example, SCSI cable) but also by a wireless connection using infrared ray and the like.

In the recording device (HDD: hard disc), a program is installed which is written with a code decodable with a microcomputer of the main controller. When the driving power of the information-processing instrument is switched on, the above program is loaded in the main memory of the main controller.

The display is provided with a displaying device (drawing is omitted) such as, for example, a CRT, a liquid crystal display (LCD), or a plasma display panel (PDP), and displays various kinds of information from a controller.

The input terminal is provided with one or more input media (drawing is omitted) selected from keyboard, mouse, pointing device and others and directs various kinds of information inputted by users to the main controller. The input media can accept wireless inputting of information. As a device which combines a display device and an input terminal together is listed, for example, a CRT with a touch-panel. The information-processing device is installed with an operating system (OS). All of the devices which constitute the information-processing device are controlled by OS.

EFFECT OF THE INVENTION

According to the present invention, optimization of a recording power at a highest linear velocity recording can be performed with high accuracy by using a simple method for controlling the recording power, thereby good recording quality can be realized on switchover of the recording linear velocity. Further, by using a writing waveform defined by the present invention, particularly at high linear velocities, recording with low jitter and low error rate can be realized. Still further, by using the format of high-frequency wobble, which can be manufactured more easily than the format of Land Pre-Pit used in DVD-R, data can be added to a data recording zone with high efficiency, and also it is possible to provide a recording medium which has almost the same format as that of CD-R and CD-RW which are currently manufactured in large amount.

EXAMPLES

The present invention will be further described in detail with reference to the following examples and comparative examples, but it should be construed that the present invention is in no way limited to those examples.

Examples 1 to 9, Comparative Examples 1 to 3

OPC provides an actual optimum recording power in an actual drive for a target recording medium. An optimum recording power is calculated in OPC (usually at the innermost circumference) as follows: a small amount of data is test-recorded while a recording power is swung in an OPC area; then a power at which the asymmetry, optimum value of β, or jitter of a target medium becomes minimum is calculated by using the asymmetry, β, or jitter values of a waveform which is obtained in test-writing where the recording power is swung. In CD-R or DVD±R, generally, both asymmetry and β are favorably around zero (0), but in many cases, it is known that they are shifted to plus side on low speed recording and to minus side on high speed recording. In the present examples, a method was used where an optimum recording power was calculated in OPC in such a manner that jitter was minimized at the optimum recording power.

On an injection-molded polycarbonate substrate with a thickness of 0.6 mm and an outside diameter of 120 mm which has a groove depth of 1660 angstroms, a half width of 0.38 μm, a track pitch of 0.74 μm, and a wobble frequency of 32 T, an organic dye layer having a thickness of 900 angstroms was formed by spin-coating dye compounds represented by the following formula 1 and formula 2 (the dye compounds were weighed in a weight ratio of 65:35 and dissolved in 2,2,3,3-tetrafluoro-1-propanol), and then the resultant organic dye layer was dried at 85° C. for 30 min.

Next, a reflective layer of Ag with a thickness of 1,100 angstroms was formed by sputtering, further a protective layer with a thickness of 5 μm made of an acrylic photopolymer was formed on the reflective layer, and then an injection-molded polycarbonate plane substrate with a thickness of 0.6 mm and an outside diameter of 120 mm was bonded with an acrylic photopolymer to obtain an optical recording medium.

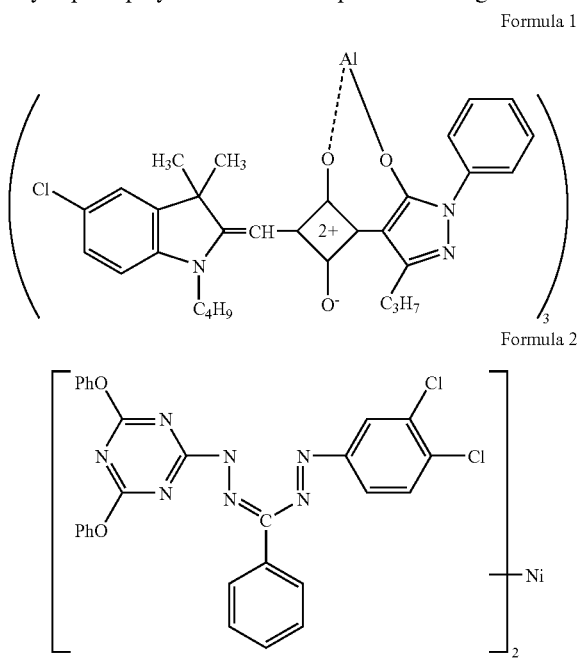

Formula 1

Formula 2

On measuring an optimum power through recording the above-described optical recording medium, conditions were set up by assuming an actual drive-recording where a recording linear velocity was switched from 21 m/s to 28 m/s at a position around 40 mm. In the actual drive-recording, recording has been continuously performed at 21 m/s up to the position around 40 mm, thereby the temperature inside of a drive has been increased and the wavelength of a recording LD shifted to longer wavelengths. The wavelength shift of the recording LD to longer wavelengths is about 0.6 nm/° C., so that 10° C. increase of temperature results in 6 nm of LD shift. This LD shift is not counted in the optimum recording power of 28 m/s which was in advance coded and recorded in a recording medium (a substrate or a stamper). In the present examples, a situation was assumed such that recording was preformed continuously at 21 m/s and the temperature inside a drive was increased by a little more than 10° C.

Figure 5:
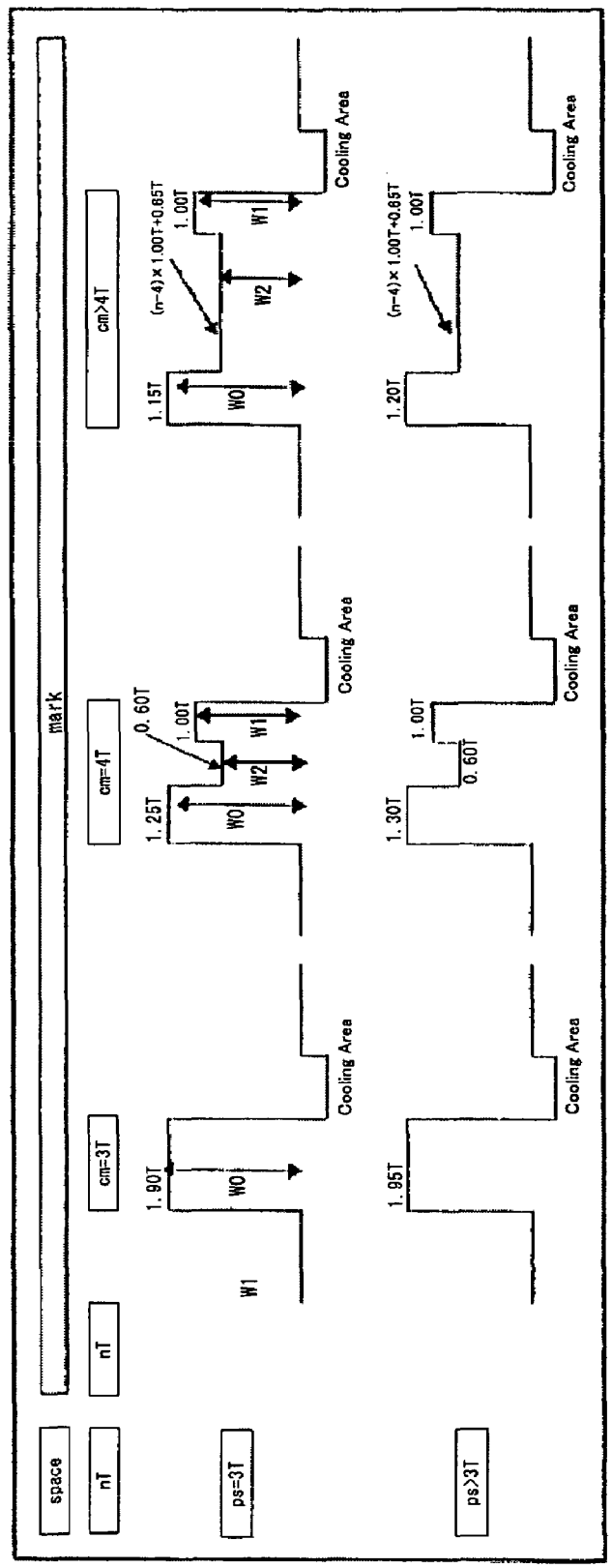
FIG. 5 is a diagram showing example 2 of a waveform for power control used at a recording linear velocity of 28 m/s in accordance with the present inventions 2 and 3.
Figure 6:
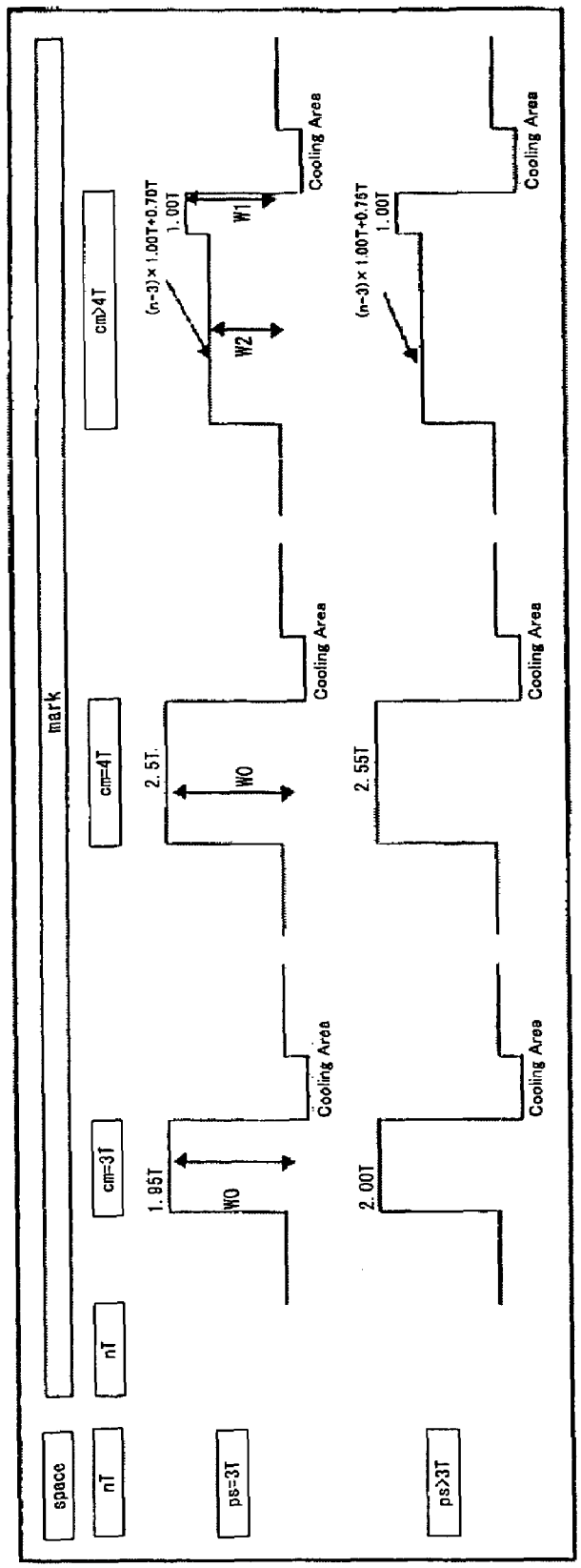
FIG. 6 is a diagram showing example 3 of a waveform for power control used at a recording linear velocity of 28 m/s in accordance with the present inventions 2 and 3.
Figure 7:
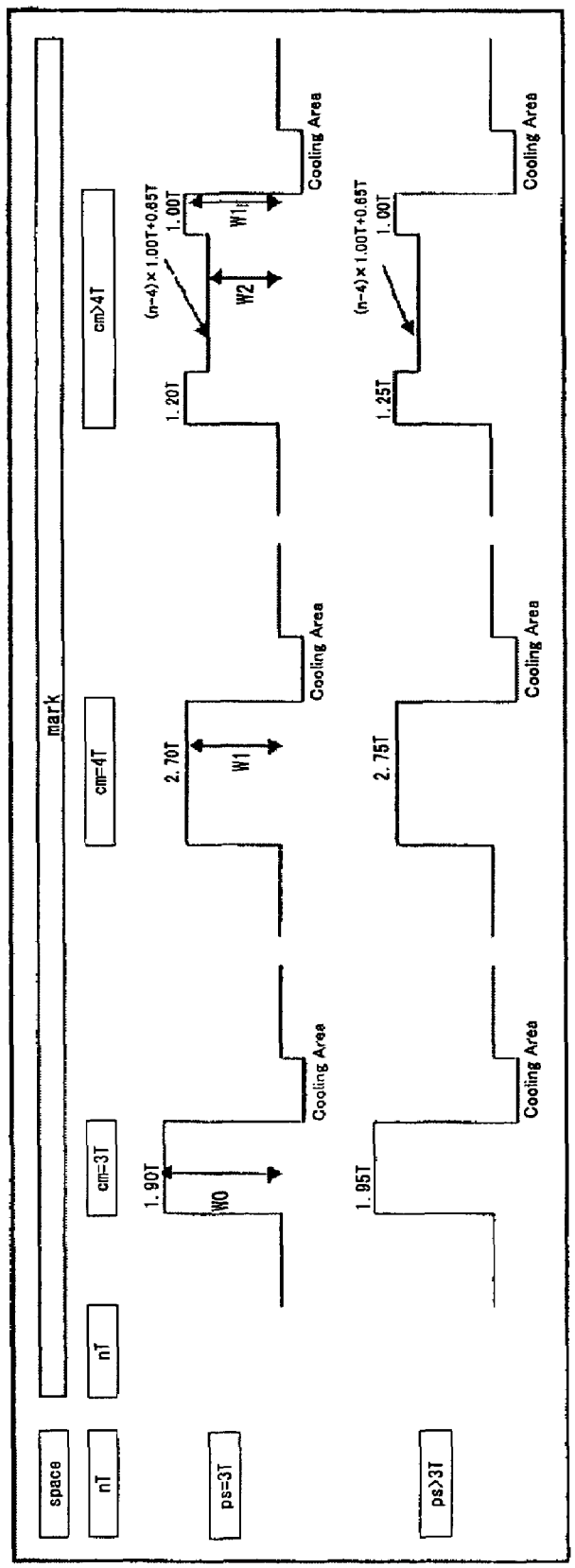
FIG. 7 is a diagram showing example 4 of a waveform for power control used at a recording linear velocity of 28 m/s in accordance with the present inventions 2 and 3.
Figure 8:
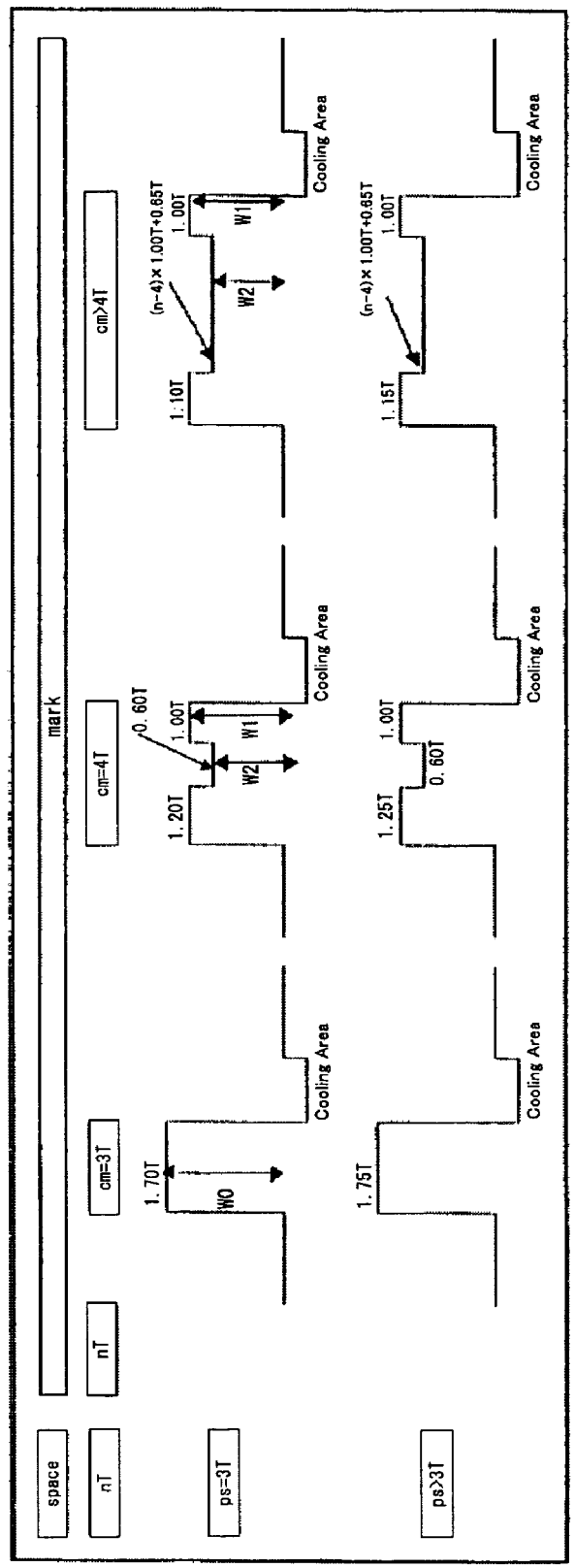
FIG. 8 is a diagram showing example 5 of a waveform for power control used at a recording linear velocity of 21 m/s in accordance with the present inventions 2 and 3.
Figure 9:
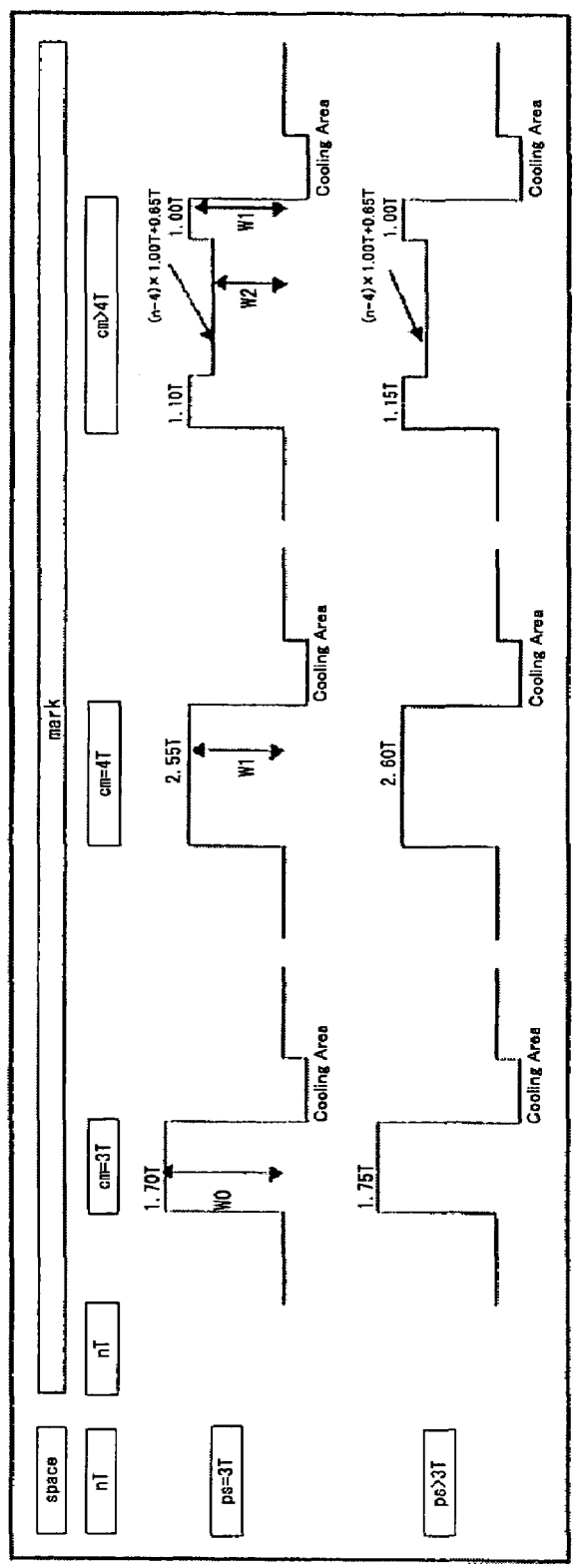
FIG. 9 is a diagram showing example 6 of a waveform for power control used at a recording linear velocity of 21 i/s in accordance with the present inventions 2 and 3.
Figure 10:
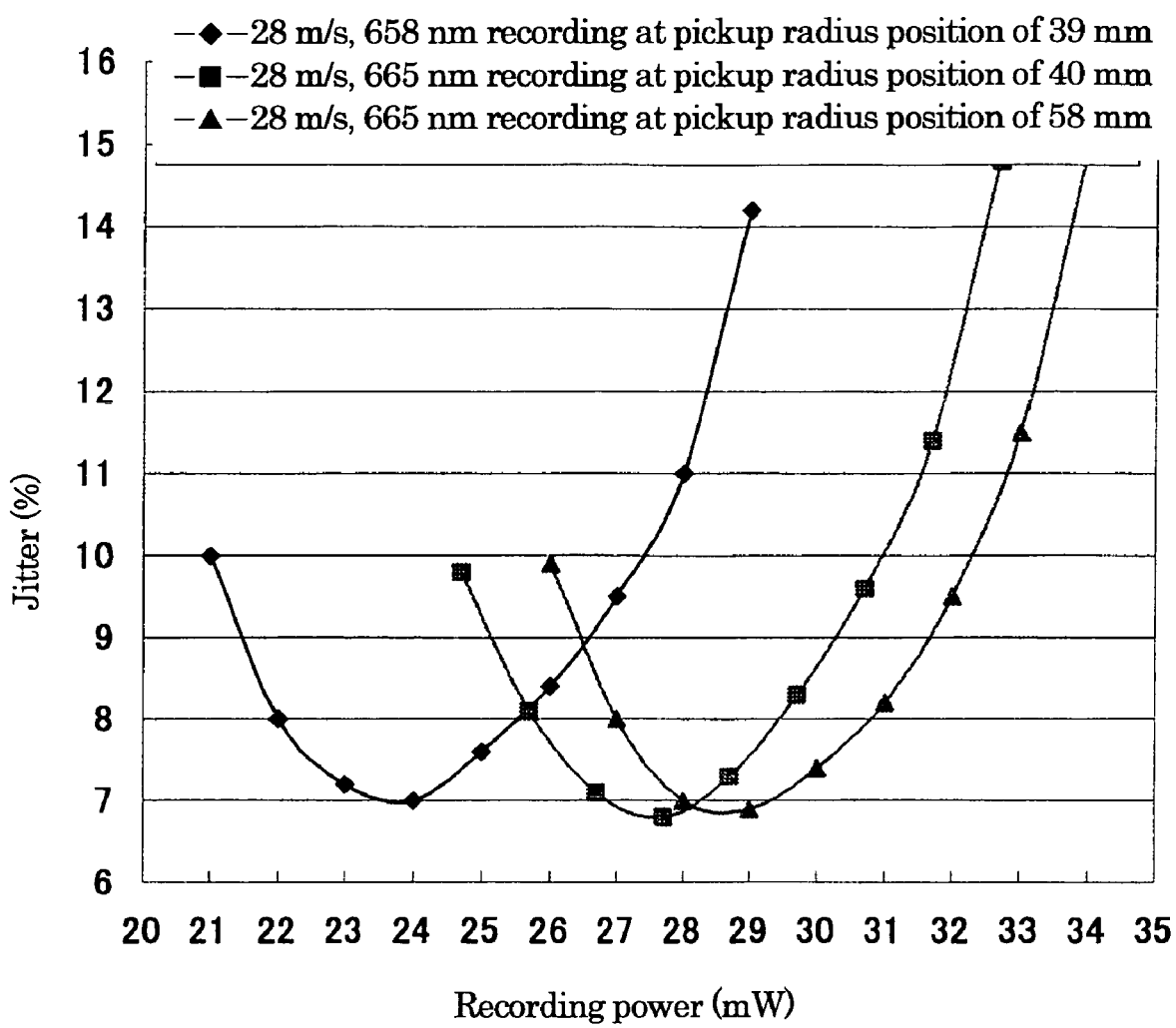
FIG. 10 is a diagram showing the relation between recording power and jitter at each radial position.

First, in the above-described optical disc, using a semiconductor laser with an oscillation wavelength of 658 nm and a beam diameter of 0.9 μm, while tracking, EFM signals (having a shortest pit length of about 0.4 μm) were recorded under the following conditions: waveform shown in FIG. 5, recording linear velocity=28 m/s, W1/W2=1.48, W0/W1=1.04, cooling power=0 mW, and cooling pulse width=2 T, wherein the recording power was switched to a power shown in FIG. 10 at the radial position of the disc of 39 mm (around 40 mm) and jitter was measured. That is, when recording and reproduction was performed by swinging the recording power at 39 mm (around 40 mm) under the conditions of the recording wavelength of 658 nm (the wavelength of test conditions at DVD medium recording) and 28 m/s, the recording power which provides a minimum jitter corresponds to Pi which is coded in the recording medium.

Then, recording was performed under the same conditions as described-above except that the oscillation wavelength changed to 665 nm and the radial position at which the recording power was switched was changed to 40 mm, whereby jitter was measured.

Further, recording was performed under the same conditions as described-above except that the oscillation wavelength changed to 665 nm and the radial position at which the recording power was switched over was changed to 58 mm, whereby jitter was also measured. That is, when recording and reproduction was performed by swinging the recording power at 40 mm under the conditions of the linear velocity of 28 m/s and the recording wavelength of 665 nm (shifted by 7 nm to longer wavelengths), the recording power which provided a minimum jitter was to be equal to Pr which was an actual optimum recording power at 40 mm (the position at which switchover to a highest recording linear velocity was performed) on the assumption that the temperature of the drive has been increased by about 10° C. However, OPC around 40 mm which is in the user area is not attainable in an actual system. Therefore, for calculating Pr with high accuracy, when recording and reproduction is performed by swinging the recording power at 58 mm (the outermost circumference and outside of the user area) under the conditions of a recording wavelength of 665 nm and a linear velocity of 28 m/s, the power which yields a minimum jitter is Po. This recording power is equal to the one which is given when OPC is performed at the outermost circumference outside of the user area.

The results of measurement are shown in FIG. 10.

An optimum recording power at 658 nm and 39 mm was 24 mW, which corresponded to a power (Pi) coded and recorded in the substrate.

Further, an optimum recording power at 665 nm and 58 mm was 29 mW, which corresponded to a power (Po) calculated in a calibration area at the outermost circumference when the wavelength of LD shifted to longer wavelengths.

Further, an optimum recording power at 665 nm and 40 mm (middle circumference) was 27.7 mW, which corresponded to an actual optimum power (Pr) at the position where switchover to the highest recording linear velocity was performed.

On the other hand, substitution of the above values of Po and Pi into the formula of the present invention, "(Po+Pi)/2+ (Po−Pi)²/Pi", yields 27.5 mW, which was nearly equal to the above-described value of 27.7 mW for Pr, thereby it was clearly shown that the present invention is extremely effective for controlling an optimum recording power.

In addition, another experiment similar to the above was conducted at 658 nm and 663 nm on the assumption of a temperature elevation of 5° C. and still another experiment which was the same experiment as above was conducted at 658 nm and 667 nm on the assumption of a temperature increase of 15° C., thereby the same effectiveness of the present invention was confirmed as in the above example.

Further, EFM signals (having the shortest pit length of about 0.4 μm) were recorded, while tracking, in the above-described optical disc at a recording power at which Bottom Jitter became minimum, using a semiconductor laser with an oscillation wavelength of 660 nm and a beam diameter of 0.9 μm, under the recording conditions and at the recording linear velocities shown in the following Table 2. Then, the recorded part was reproduced to obtain jitter value, asymmetry, and PI error number. The waveforms of a recording laser beam were as shown in FIGS. 4 to 9. In FIGS. 4 to 9, "W0" indicates a pulse power for a shortest mark or an enhanced power for a mark other than the shortest mark; "W1" indicates a power which is for a mark other than a shortest mark and is enhanced by additional power; and "W2" indicates is a base power which is for a mark other than a shortest mark and is without additional power.

In addition, as the pulse lengths for linear velocities of 21 m/s and 28 m/s the pulse lengths shown in FIGS. 4 to 9 were used, but this does not limit the scope of the present invention. In FIGS. 4 to 9, "space" indicate space, "mark" indicate mark, "Cooling Area" indicates cooling area, "T" indicates basic clock cycle, "n," indicates an integer of 3 or more, "n" indicates an integer of 3 or more, "ps" indicates the length of the immediately preceding space, and "cm" indicates recording mark length.

Results are given in Table 2. Good results were obtained for all of the jitter, asymmetry, and PI error. From these results, recording waveforms according to the present invention were found to be extremely effective to realize high quality recording, when recording was performed at 21 m/s which was used as a linear velocity before the switchover of linear velocity was performed, and also when recording was preformed at 28 m/s which was used as a highest linear velocity.

TABLE 2

|  | Recording linear velocity (m/s) | Cooling power at rear edge of pulse (mW) | Cooling pulse length (T) | W1/W2 | W0/W1 | Jitter | Asymmetry | PI error | Table 1 correction |
|---|---|---|---|---|---|---|---|---|---|
| Example 1 | 21 (FIG. 8) | 0 | 1 | 1.55 | 1.00 | 7.8 | 0.00 | 6 | yes |
| Example 2 | 21 (FIG. 9) | 0 | 1.5 | 1.60 | 1.15 | 9.0 | 0.01 | 4 | no |
| Example 3 | 21 (FIG. 8) | 0.1 | 0.8 | 1.65 | 1.20 | 7.0 | 0.00 | 5 | yes |
| Example 4 | 28 (FIG. 6) | 0 | 2.0 | 1.80 | 1.08 | 7.4 | 0.01 | 2 | yes |
| Example 5 | 28 (FIG. 4) | 0 | 2.0 | 1.56 | 1.08 | 6.9 | 0.00 | 9 | yes |
| Example 6 | 28 (FIG. 5) | 0.1 | 2.5 | 1.50 | 1.16 | 6.8 | −0.01 | 8 | yes |
| Example 7 | 28 (FIG. 7) | 0 | 2.0 | 1.75 | 1.25 | 7.8 | −0.01 | 7 | yes |
| Example 8 | 28 (FIG. 7) | 0 | 0.4 | 1.75 | 1.25 | 7.9 | −0.04 | 18 | yes |

Further, EFM signals (having the shortest pit length of about 0.4 μm) were recorded, while tracking, in the above-described optical disc at a recording power at which Bottom Jitter became minimum, using a semiconductor laser with an oscillation wavelength of 660 nm and a beam diameter of 0.9 μm, under the recording conditions and at the recording linear velocities as shown in the following Table 3 and also under the condition of "yes" for Table 1 correction. Then the recorded part was reproduced to obtain jitter value, asymmetry, and PI error number.

In comparative examples 1 to 3, an optical recording medium was produced in the same manner as in the examples using a test-condition stamper whose LPPb was swung (changed) and a molded substrate, and evaluation was performed in the same manner as in the examples; wherein LPPb is an LPP signal amplitude before recording used in LPP format which is actually employed in DVD-R.

TABLE 3

|  | Recording linear velocity (m/s) | Cooling power at rear edge of pulse (mW) | Cooing pulse length (T) | W1/W2 | W0/W1 | Jitter | Asymmetry | PI error | LPPb value |
|---|---|---|---|---|---|---|---|---|---|
| example 9 | 21 (FIG. 8) | 0 | 1.5 | 1.60 | 1.05 | 7.1 | 0.00 | 7 | none |
| comparative example 1 | 21 (FIG. 8) | 0 | 1.5 | 1.60 | 1.05 | 7.0 | 0.00 | 8 | 0.10 |

TABLE 3-continued

| | Recording linear velocity (m/s) | Cooling power at rear edge of pulse (mW) | Cooing pulse length (T) | W1/W2 | W0/W1 | Jitter | Asymmetry | PI error | LPPb value |
|---|---|---|---|---|---|---|---|---|---|
| comparative example 2 | 21 (FIG. 8) | 0 | 1.5 | 1.60 | 1.05 | 7.6 | 0.00 | 35 | 0.24 |
| comparative example 3 | 21 (FIG. 8) | 0 | 1.5 | 1.60 | 1.05 | 7.5 | 0.00 | 510 | 0.37 |

As is apparent from the results shown in the above Table 3, PI error increased as LPPb increased for a sample medium with LPP format even if good jitter was obtained as in comparative examples 2 and 3. In addition, even if there were no problems in jitter, asymmetry, and PI error, but LPPb level was below 0.16 as in comparative example 1, it was confirmed that address detection with a commercial apparatus became unattainable.

What is claimed is:

1. A method for recording and reproducing a recordable DVD medium, the method comprising data recording of the recordable DVD medium by a plurality of marks having varying lengths,
wherein data recording comprises:
starting recording of the recordable DVD medium under the condition of a CLV linear velocity other than a highest linear velocity at an innermost circumference, wherein the recordable DVD medium comprises a recording layer containing an organic dye and a disc-form substrate having a guide groove provided with wobble, wherein a recording condition for a CLV highest linear velocity and a recording condition for a CLV linear velocity other than the highest linear velocity are coded and recorded in advance at a given position of the substrate;
performing test-writing in a power calibration area at an outermost circumference so as to obtain an optimum recording power of Po at the highest linear velocity when switchover to recording with the highest linear velocity is performed at a radial position where rotation at the highest linear velocity becomes attainable; and
restarting recording of the recordable DVD medium under the condition of the highest linear velocity and a recording power set by a result of comparison which is made between the optimum recording power of Po at the highest linear velocity that is temporarily optimized by the test-writing and an optimum recording power of Pi at the highest linear velocity that is coded and recorded in advance in the substrate;
in the case of Po>Pi, a recording power given by the formula of $$(Po+Pi)/2+(Po-Pi)^2/Pi$$

is employed as a recording power with which recording starts at the highest recording velocity, and in the case of Po≦Pi, Pi is employed as a recording power with which recording starts at the highest linear velocity.

2. A method for recording and reproducing a recordable DVD medium according to claim 1 wherein when data recording:
a shortest mark is always recorded by one pulse-light having a power of W0;
a second shortest mark is recorded by one pulse-light having a power of W0, a power of W1 which is lower than W0, or a power which has a base power of W2 lower than W1 and is enhanced to W0 or W1 for a given duration at the front and/or rear edges of the pulse-light; and
a third shortest and longer marks are recorded by one pulse-light having a power which has a base power of W2 lower than W1 and is enhanced to W0 or W1 for a given duration at the front and/or rear edges of the pulse-light,
wherein in the course of recording a mark, a cooling pulse is irradiated after the rear edge of the above-described pulse-light for every mark, and the irradiating light quantity of the cooling pulse is set at 0.1 mW or less for a given duration.

3. A method for recording and reproducing a recordable DVD medium according to claim 2, wherein the irradiation time of the cooling pulse after the rear edge of the pulse-light is set to be ⅙ to ⅚ of the length of a shortest space.

4. A method for recording and reproducing a recordable DVD medium according to claim 1, wherein, when data recording:
the heating pulse width of a recording pulse which forms a mark having an immediately preceding space whose length is the shortest is determined based on whether the length of the mark is the shortest or not, wherein the heating pulse width for the mark having the shortest length is set longer at the front end than the heating pulse width of a mark whose length is not the shortest; and
the heating pulse width of a recording pulse which forms a mark having the shortest length is determined based on whether the length of a space immediately preceding the mark whose length is the shortest is the shortest or not, wherein the heating pulse width of a mark having the immediately preceding space whose length is the shortest is set shorter at the front end than the heating pulse width of a mark having the immediately preceding space whose length is not the shortest.

5. A method for recording and reproducing a recordable DVD medium according to claim 1, wherein the above-described wobble has a frequency of 4 T to 96 T on the basis of a basic clock cycle of T.

6. A method for recording and reproducing a recordable DVD medium according to claim 1, wherein the wavelength of a pulse-light for said recording and reproducing is 600 run to 720 nm.

7. A method for recording and reproducing a recordable DVD medium according to claim 1, wherein a single recording layer has a refractive index (n) of $1.5 \leq n \leq 3.0$ and an extinction coefficient (k) of $0.02 \leq k \leq 0.2$ for light of wavelength of recording and reproduction light ±5 nm.

8. A method for recording and reproducing a recordable DVD medium according to claim 1, wherein the recordable DVD medium has, as a constituent layer other than the recording layer, one or more layers selected from a reflective layer, a protective layer, an adhesive layer, a protective substrate and a hard-coating layer on the substrate surface.

9. A method for recording and reproducing a recordable DVD medium according to claim 8, wherein the adhesive layer, which forms a two-sided recording medium by bonding together two substrates either one of which has a guide groove provided with wobble, is placed between the two substrates, and an adhesive used for the adhesive layer is a UV-setting resin.

* * * * *